(12) United States Patent
Izukawa

(10) Patent No.: US 7,671,917 B2
(45) Date of Patent: Mar. 2, 2010

(54) IMAGE TAKING APPARATUS, IMAGE TAKING SYSTEM, AND LENS APPARATUS

(75) Inventor: Kazuhiro Izukawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 922 days.

(21) Appl. No.: 11/002,908

(22) Filed: Dec. 3, 2004

(65) Prior Publication Data
US 2005/0128342 A1  Jun. 16, 2005

(30) Foreign Application Priority Data
Dec. 12, 2003  (JP) .............................. 2003-415793

(51) Int. Cl.
 *H04N 5/225* (2006.01)
(52) U.S. Cl. ...................... 348/340; 348/375
(58) Field of Classification Search ............ 348/240.99, 348/375, 333.08, 340, 341, 335
See application file for complete search history.

(56) References Cited

U.S. PATENT DOCUMENTS

| 5,357,298 | A | * | 10/1994 | Imai et al. | .................... | 396/446 |
| 5,600,371 | A | * | 2/1997 | Arai et al. | .................... | 348/335 |
| 7,148,928 | B2 | | 12/2006 | Minakuti et al. | ............ | 348/360 |
| 7,151,570 | B2 | | 12/2006 | Kaneda | ........ | 348/360 |
| 2006/0176389 | A1 | | 8/2006 | Kaneda | ........ | 348/335 |

FOREIGN PATENT DOCUMENTS

| JP | 02-039777 | 2/1990 |
| JP | 3-55829 | 3/1991 |
| JP | 03-076384 | 4/1991 |
| JP | 3055829 | 4/2000 |
| JP | 2000-241868 | 9/2000 |
| JP | 2002-190981 | 7/2002 |
| JP | 2002-244195 | 8/2002 |
| JP | 2003-078794 | 3/2003 |
| JP | 2003-134390 | 5/2003 |
| JP | 2003-158666 | 5/2003 |

OTHER PUBLICATIONS

European Search Report dated Oct. 6, 2009, in application No. 04029159.3—1241/1542455.

* cited by examiner

Primary Examiner—Jason Chan
Assistant Examiner—Nicholas G Giles
(74) Attorney, Agent, or Firm—Fitzpatrick, Cella, Harper & Scinto

(57) ABSTRACT

The present invention discloses an image taking apparatus which can control image deterioration caused by the image size of an attached lens apparatus and image generating region of an image pickup element not corresponding. The image taking apparatus has an image pickup element which photoelectrically converts an object image formed by the attached lens apparatus; an image producing section which produces recording image data to be recorded based on an output from the image pickup element; and a controller which judges an image size of the attached lens apparatus and changes an image producing region for producing the recording image data within a light receiving region of the image pickup element based on the judged image size.

4 Claims, 21 Drawing Sheets

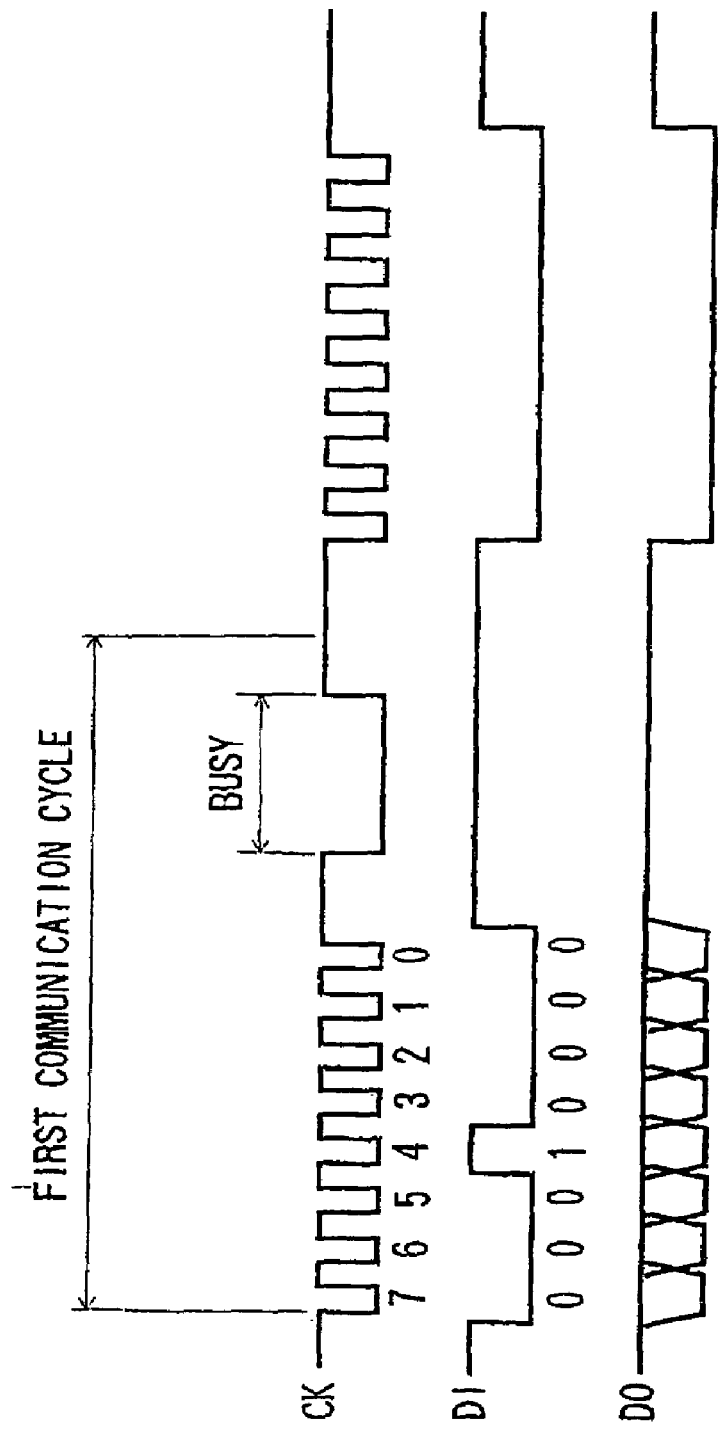

CAUTION: IMAGE TAKING IS IMPOSSIBLE. THE IMAGE CIRCLE OF THE ATTACHED LENS APPARATUS DOES NOT CORRESPOND TO THE IMAGE CIRCLE OF SET RECORDING IMAGE DATA REGION. PLEASE SET CORRECT RECORDING IMAGE DATA REGION. ~49a

~25a

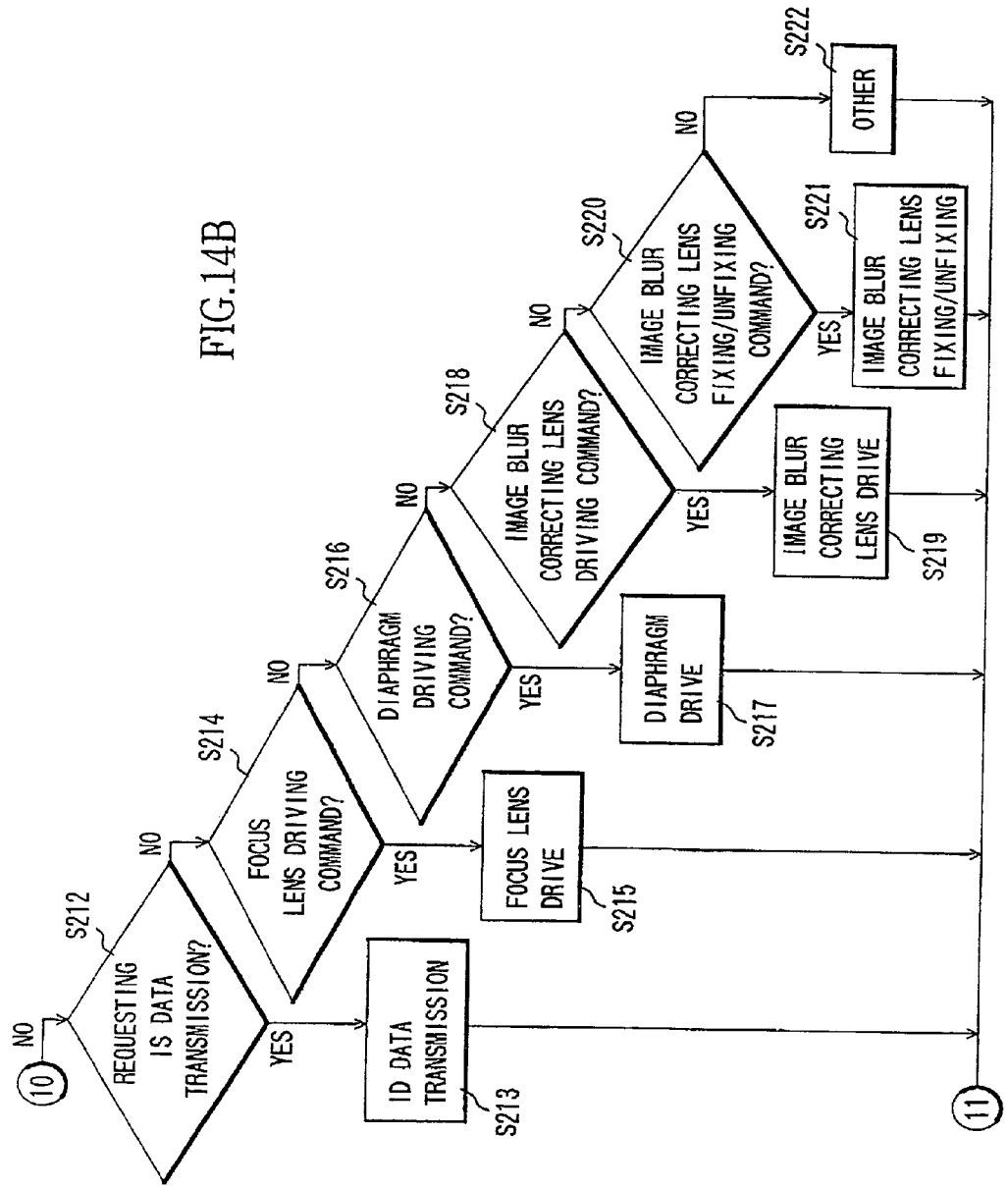

IMAGE TAKING APPARATUS, IMAGE TAKING SYSTEM, AND LENS APPARATUS

BACKGROUND OF THE INVENTION

1. Field of the Invention

The present invention relates to an image taking apparatus to which lens apparatuses having mutually different image sizes can be attached, lens apparatuses to be attached to the image taking apparatus, and an image taking system.

2. Description of the Related Art

Conventionally, cameras to which a plurality of lens apparatuses are detachably attached have been provided. In addition, a camera whose frame dimensions are switched so as to conform to an image circle of an attached lens apparatus is disclosed in Japanese Patent No. 3055829.

In the conventional camera as described above, since a mechanism which mechanically switches the frame dimensions based on an image circle of an attached lens unit is provided, the camera has been increased in size or has become costly.

SUMMARY OF THE INVENTION

One aspect of an image taking apparatus of the present invention is an image taking apparatus to which a plurality of lens apparatuses having mutually different image sizes are selectively attached. The image taking apparatus comprises an image pickup element which photoelectrically converts an object image formed by the attached lens apparatus, an image producing section which produces recording image data to be recorded based on an output from the image pickup element; and a controller which judges an image size of the attached lens apparatus and changes an image producing region for producing the recording image data within a light receiving region of the image pickup element based on the judged image size.

One aspect of a lens apparatus of the present invention is a lens apparatus attached to the image taking apparatus described above. The lens apparatus comprises a lens; a memory which stores information on the image size of the lens apparatus; and a communicating unit which transmits the information on the image size to the image taking apparatus.

One aspect of an image taking system of the present invention comprises the image taking apparatus described above; and a first lens apparatus having a first image size or a second lens apparatus having a second image size different from the first image size, which can be attached to the image taking apparatus.

Features of the image taking apparatus, the lens apparatus and the image taking system of the invention will become more clear from the following detailed description of the embodiments with reference to the drawings.

BRIEF DESCRIPTION OF THE DRAWINGS

FIG. 2 is a timing chart showing communications between the lens apparatus and camera body in Embodiment 1.

FIGS. 14A and 14B are flowcharts showing operations at the lens apparatus side in Embodiment 3.

DETAILED DESCRIPTION OF THE PREFERRED EMBODIMENTS

Embodiment 1

Figure 1:
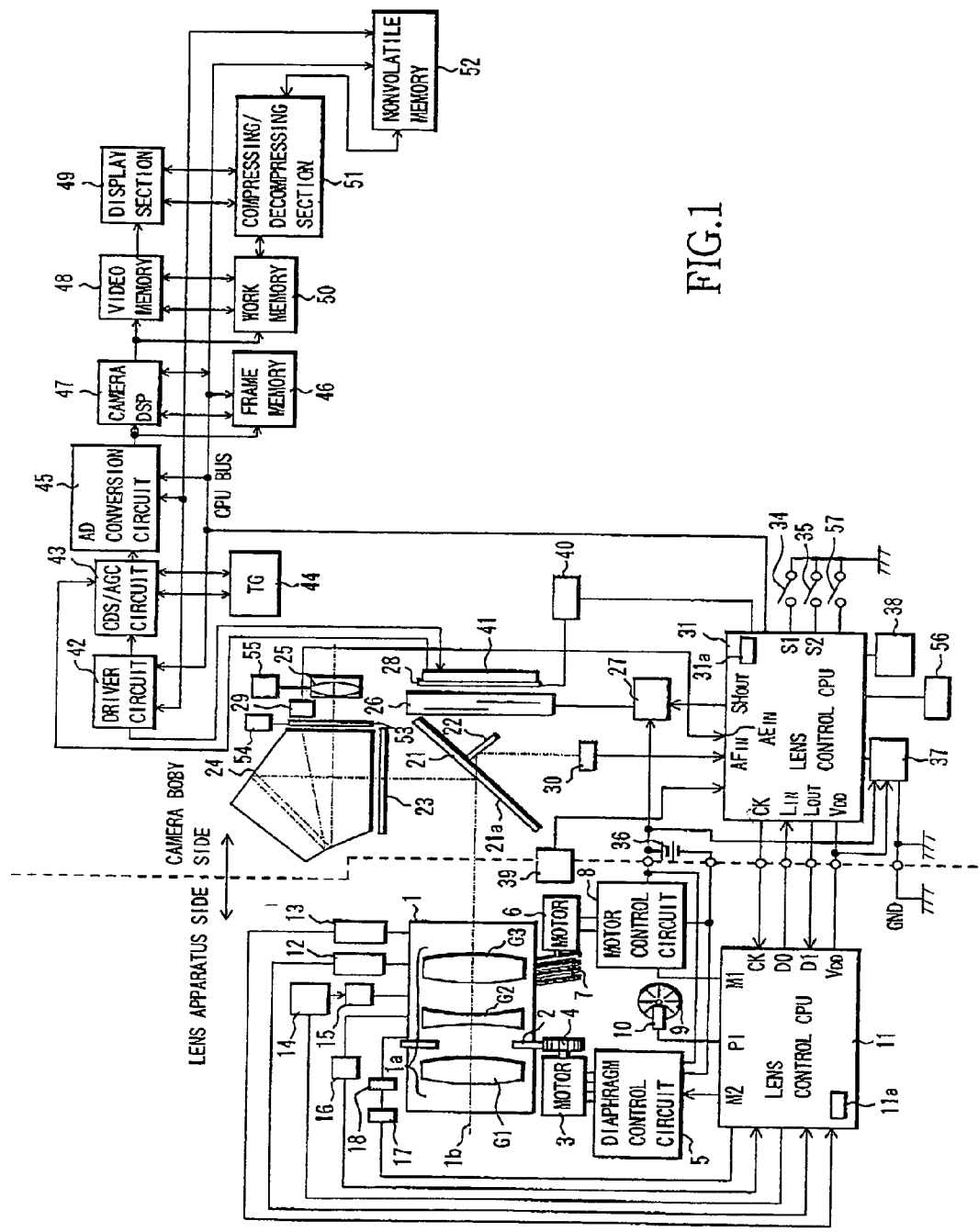
FIG. 1 shows a block diagram of an image-taking system, which is Embodiment 1 of the present invention.

FIG. 1 is a block diagram showing a main part of a image-taking system (camera system), which is Embodiment 1 of the present invention, wherein the left side of the dotted line drawn in FIG. 1 shows an internal structure of a lens apparatus, and the right side of the dotted line shows an internal structure of a camera body.

In FIG. 1, Reference Numeral 1 denotes a lens barrel, which holds a plurality of lenses G1, G2, and G3 to compose an image taking lens 1a. Reference Numeral 2 denotes a diaphragm to adjust the amount of light being incident onto an image plane, and the diaphragm 2 receives a driving force from a diaphragm driving motor 3 via a pinion gear 4 and changes the aperture area of a light passing aperture. Reference Numeral 5 denotes a diaphragm control circuit, which drives the diaphragm driving motor 3 based on a signal from a lens control CPU 11 provided in the lens apparatus and controls operation of the diaphragm 2.

Reference Numeral 6 denotes a focus driving motor, which drives a focus lens (not shown) out of the image taking lens 1a in the direction of an optical axis 1b via a worm gear 7 to perform focus driving. Reference Numeral 8 denotes a motor control circuit, which controls focus driving by driving the motor 6 based on a signal from the lens control CPU 11. Reference Numeral 9 denotes a pulse board, which is attached to a rotating shaft coupled with the focus driving motor 6 and rotates in accordance with a drive of the focus driving motor 6. Reference Numeral 10 denotes a photo interrupter, which detects a rotating condition of the pulse board 9 and inputs the detection result into the lens control CPU 11. The lens control CPU 11 performs control of focus driving based on an output from the photo interrupter 10.

Reference Numeral 12 denotes a focus zone detector, which has a switch to detect a focus lens position by using, for example, a brush moving on the surface of an electrode arranged on a plane surface or a curved surface in accordance with a movement in the optical axis direction of the focus lens of the image taking lens 1a. The lens control CPU 11 transmits optical information concerning a focus lens position to a camera control CPU 31 in accordance with an output from the focus zone detector 12 or performs drive control of the diaphragm control circuit 5 and motor control circuit 8 in accordance with a focus lens position.

Herein, respective terminals of the lens control CPU 11 will be described.

Reference Symbol CK denotes a clock input terminal to synchronize communications between the camera control CPU 31 of the camera body side and lens control CPU 11 of the lens apparatus side. Reference Symbol DO denotes a data output terminal to transmit data of the lens apparatus side to the camera body side, and Reference Symbol DI denotes a data input terminal into which data and a command from the camera body side are inputted.

Reference Symbol M1 denotes an output terminal to output, to the motor control circuit 8, signals to control ON/OFF, driving speed, and the driving direction of the focus driving motor 6, and Reference Symbol M2 denotes an output terminal to output, to the diaphragm control circuit 5, signals to control ON/OFF, the driving direction, and the driving amount of the diaphragm driving motor 3.

Reference Symbol PI denotes an input terminal into which a signal from the photo interrupter 10 is inputted, and the lens control CPU 11 detects the rotating amount and rotating speed of the focus driving motor 6 based on the input signal Reference Symbol VDD denotes a terminal to receive a power supply from a power source provided on the camera body side.

Reference Numeral 13 denotes a zoom detector, which outputs, for example, in accordance with a movement of the zoom lens in the optical axis direction, a signal concerning a zoom lens position by using a switch such as a brush. The lens control CPU 11 detects a zoom lens position in accordance with an output from the zoom detector 13 and transmits optical information concerning the zoom lens position to the camera control CPU 31. In addition, the lens control CPU 11 performs, in accordance with a zoom lens position, drive control of the diaphragm control circuit 5 and motor control circuit 8.

Reference Numeral 14 denotes an image blur correcting drive circuit, which drives an image blur correcting lens G2 of the image taking lens 1a within a plane substantially orthogonal to the optical axis 1b by supplying electricity to an image blur correcting motor 15 based on a control signal from the lens control CPU 11.

Concretely, the image blur correcting drive circuit 14 makes the image blur correcting lens G2 operate within a plane substantially orthogonal to the optical axis 1b by controlling drives of a unit to shift the image blur correcting lens G2 in a pitch direction and a unit to shift the image blur correcting lens G2 in a yaw direction, respectively. Namely, by shifting the correcting lens G2 in a direction to cancel out a shake exerted on the image-taking system, a shake of an object image on an image plane is corrected.

Reference Numeral 16 denotes an image blur correcting lens position detecting section, which detects a position of the image blur correcting lens G2 in the pitch direction and yaw direction and outputs this detection signal to the lens control CPU 11. Concretely, the position of the image blur correcting lens G2 is detected by arranging a projecting LED (not shown) so as to shift with the image blur correcting lens G2 and detecting a shifting amount of the LED by use of a light receiving PSD (not shown), and this is transmitted to the lens control CPU 11.

Reference Numeral 17 denotes a fixing mechanism drive circuit to control a drive of a fixing mechanism 18 based on an output of the lens control CPU 11. Herein, the fixing mechanism 18 is for fixing the image blur correcting lens G2 when an image blur correcting drive is not performed such as when the power of the image-taking system is off.

The lens control CPU 11 controls various operations of the lens apparatus side based on signals from the camera control CPU 31 provided on the camera body side. Here, in a memory 11a of the lens control CPU 11, information concerning image circle (image size), information concerning flange focal length, lens ID codes indicating product types, etc., of the lens apparatus, AE optical data for automatic exposure control, AF optical data for automatic focusing, and image processing optical data including spectral transmittance data, etc., are stored.

Next, the structure of the camera body side will be described.

Reference Numeral 21 denotes a main mirror which turns so as to be slantingly provided and retractable with respect to an image taking light path through which an image taking light flux passes, and its center portion is formed as a half mirror surface 21a. When the main mirror 21 is positioned in the image taking light path, the main mirror 21 reflects a part of an image taking light flux passed through the image taking lens 1a toward a focusing screen 23 Since the focusing screen 23 is arranged so as to optically conjugate with an image pickup plane, an object image is formed on the surface of the focusing screen 23.

Reference Numeral 22 denotes a sub-mirror, which is arranged on the rear surface of the main mirror 21. This sub-mirror 22 reflects a light flux, which is passed through the half mirror surface 21a of the main mirror 21 positioned in the image taking light path, toward a focus detector 30 side.

Reference Numeral 24 denotes a pentaprism, which guides the object image formed on the focusing screen 23 as an erected image to an eyepiece 25. Reference Numeral 53 denotes a visual field changing member, which changes a field region observed via the eyepiece 25. A visual field changing member driving section 54 drives the visual field changing member 53 based on an output of the camera control CPU 31 so that the field region conforms to recording image data dimensions. Reference Numeral 55 denotes a variable power driving section which drives the eyepiece 25 based on a command from the camera control CPU 31 to vary the magnification of a finder optical system.

Reference Numeral 26 denotes a focal plane shutter, which is driven by a shutter drive circuit 27 which has received a control signal from the camera control CPU 31. By an opening/closing operation of the focal plane shutter 26, an exposure of an image pickup element 41 such as a CCD sensor or CMOS image sensor is performed.

Reference Numeral 28 denotes an optical lowpass filter for repressing an aliasing in the image pickup element 41. Reference Numeral 29 denotes a photometric element which measures illuminance (object luminance) of the object image formed on the focusing screen 23 and inputs this measurement result into the camera control CPU 31. The camera control CPU 31 calculates an exposure value based on an output of the photometric element 29.

The camera control CPU 31 on the camera body side controls various operations of the camera body side and controls various operations of lens apparatus side by communicating with the lens control CPU 11 of the lens apparatus side. In a memory 31a of the camera control CPU 31, necessary optical data and design values of already-manufactured available lens apparatus and correction data concerning sensitivities of respective pixels of the image pickup element 41 measured during manufacturing are stored.

Herein, respective terminals of the camera control CPU 31 on the camera body side will be described.

Reference Symbol CK denotes a clock output terminal which synchronizes communications between the camera control CPU 31 on the camera body side and lens control CPU 11 on the lens apparatus side. Reference Symbol LIN denotes an input terminal into which data from the lens apparatus side is inputted, and Reference Symbol LOUT denotes a data output terminal which outputs a command and data from the camera body side to the lens apparatus side. Reference Symbol VDD denotes a terminal to receive an electric power supply from a power source provided on the camera body side.

Reference Symbol S1 denotes an input terminal of a switch 34 to start an image taking preparatory operation (such as a focusing operation or a photometric operation), Reference Symbol S2 denotes an input terminal of a switch 35 to start an image taking operation. These switches 34 and 35 turn ON by a half-pressing and full-pressing operation of a release button provided on the camera body, respectively.

Reference Symbol AFIN denotes a data input terminal of a focus detector 30, and Reference Symbol AEIN denotes a data input terminal of the photometric element 29. Reference Symbol SHOUT denotes an output signal terminal to the shutter drive circuit 27.

Reference Numeral 34 denotes a switch (hereinafter, this is also described as a switch SW1) for starting an image taking preparatory operation, and Reference Numeral 35 denotes a switch (hereinafter, this is also described as a switch SW2) for starting an image taking operation. Reference Numeral 36 denotes a battery to be a driving power source of the camera body and lens apparatus. Reference Numeral 37 denotes a stabilizing power source which stabilizes a power source of the battery 36 into a necessary voltage and supplies the camera control CPU 31 with the same.

Reference Numeral 38 denotes an operating section which sets an image taking mode, etc., of the camera, and the camera control CPU 31 performs setting of an image taking mode, etc., in accordance with an output of the operating section 38. Reference Numeral 39 denotes a lens detecting section to detect mounting state of the lens apparatus, and the lens detecting section 39 outputs this detection result to the camera control CPU 31. Reference Numeral 40 denotes an optical lowpass filter detecting section to detect an attaching state of the optical lowpass filter 28, and the optical lowpass filter detecting section 40 outputs this detection result to the camera control CPU 31. The camera control CPU 31 makes information concerning presence/absence of the optical lowpass filter 28 be displayed on a display section (not shown) in accordance with the detection result of the optical lowpass filter detecting section 40. In addition, the camera control CPU 31 can also partially change an image processing method (which will be described later) in accordance with the setting at the operating section 38 and presence/absence of the optical lowpass filter 28.

Reference Numeral 56 denotes a vibration detecting section composed of a vibratory gyro-sensor, which detects a hand shake (concretely, angular velocity or the like) of the camera body and outputs this detection result to the camera control CPU 31. The camera control CPU 31 outputs, based on the detection result of the vibration detecting section 56, a drive control signal for an image blur correcting drive circuit 14 to the lens control CPU 11 and performs drive control of the image blur correcting lens G2 to eliminate an image shake.

Reference Numeral 57 denotes a switch to set dimensions of recording image data, and the camera control CPU 31 switches the dimensions of recording image data in accordance with an ON/OFF state of the switch 57. For example, when the switch 57 is in an ON state, recording image data dimensions corresponding to an image circle $\phi 1$ can be set, and when in an OFF state, recording image data dimensions corresponding to an image circle $\phi 2$ can be set.

Reference Numeral 41 denotes an image pickup element, which takes an image formed by an image taking optical system of the lens apparatus side while the focal plane shutter 26 is open. As this image pickup element 41, for example, a COOS sensor or CCD sensor which converts an optical image to electrical signals by photoelectric conversion, accumulates the electrical signals and can nondestructively read out an accumulated electrical charge can be used.

Reference Numeral 42 denotes a driver circuit to perform a horizontal drive and a vertical drive of respective pixels of the image pickup element 41, and the image pickup element 41 outputs an image signal by performing a drive in accordance with an output from the driver circuit 42. In addition, the driver circuit 42 changes, as will be described later, pixels to output signals within the image pickup element 41 in accordance with an image circle of image formed on the image pickup element 41. For example, when a CMOS sensor is used as an image pickup element 41, a region of pixels from which charge accumulated signals are read out (recording pixel region) can be specified by the driver circuit 42. Here, when a CCD sensor is used as an image pickup element 41, a recording region (recording pixel region) is specified after charge accumulated signals are read out from all pixels.

Reference Numeral 43 denotes a CDS/AGC circuit which removes noise from output signals of the image pickup element 41 by a widely-known CDS circuit and regulates the amplification degree of output signals by a widely-known AGC circuit. Reference Numeral 44 denotes a timing generator (TG) which is controlled by the camera control CPU 31 to determine drive timing of the whole circuit. Since an image processing requires executing a designated operation in a short time, not only by the camera control CPU 31, management of a short time is also performed by the timing generator 44. Here, the CDS/AGC circuit 43 is also controlled by, similarly, outputs of the camera control CPU 31 and timing generator 44.

Reference Numeral 45 denotes an AD conversion circuit, which performs AD-converts to an output of the CDS/AGC circuit 43 based on outputs of the camera control CPU 31 and timing generator 44 and outputs digital data of respective pixels. Reference Numeral 46 denotes a frame memory, which stores an output of the AD conversion circuit 45. Furthermore, in a case of continuous image taking or the like, respective pixels data of all image data obtained by this image taking is temporarily stored in the frame memory 46.

Reference Numeral 47 denotes a camera DSP (image producing section), which produces, respective color signals of RGB from an output of the AD conversion circuit 45 or respective pixels data stored in the frame memory 46 based on outputs of the camera control CPU 31 and timing generator 44. At this time, by use of data for image processing of the lens apparatus obtained by communications with the lens control CPU 11, or in accordance with presence/absence of the optical lowpass filter 28, an image processing is performed.

Reference Numeral 48 denotes a video memory, which stores image data suitable for a display of a display section 49. When the operating section 38 is operated, the video memory 48 stores, based on outputs of the camera control CPU 31 and timing generator 44, image data produced by the camera DSP 47 and displays image data on the display section 49. Herein, in some cases, as will be described later, the size of an image to be displayed is changed so as to conform to the recording image data dimensions by the video memory 48.

Reference Numeral 50 denotes a work memory, which stores an output after an image processing performed by the camera DSP 47. Reference Numeral 51 denotes a compressing/decompressing section 51, which compresses and decompresses data, based on outputs of the camera control CPU 31 and timing generator 44, according to a predetermined compression format (for example, a JPEG format.)

Reference Numeral 52 denotes a nonvolatile memory, which stores data compressed by the compressing/decompressing section 51. For example, a nonvolatile memory such as a flash memory, a hard disk or the like can be used. In addition, when compressed image data after image taking stored in the nonvolatile memory 52 is observed, the data is decompressed to respective pixels data in normal image taking by the compressing/decompressing section 51, and this is stored in the video memory 48 and is displayed on the display section 49.

Processing at the time of image taking can be performed in a short time, therefore, it is made possible that, immediately after image taking, data is stored from the work memory 50 to the nonvolatile memory 52 and a display is performed by the display section 49.

Next, data communications between the lens control CPU 11 of the lens apparatus side and camera control CPU 31 of the camera body side will be described by use of FIG. 2. FIG. 2 is a timing chart showing communications between the lens apparatus and the camera body.

In FIG. 2, Reference Symbols CK, DI (LOUT), and DO (LIN) denote, as described above, signal lines to perform serial communications between the camera body and lens apparatus. Data communications are performed at 8 bits, and eight clocks compose one communications cycle.

Reference Symbol DI (LOUT) denotes a signal line to send out a command and data from the camera body side to the lens apparatus side, and in the first communications cycle of FIG. 2, this shows 00010000B (B stands for binary). Reference Symbol DO (LIN) denotes a signal line to send out data from the lens apparatus side to the camera body side, and since, in FIG. 2, data of a communications result of one cycle before the first communications cycle appears, this is undefined in FIG. 2.

In FIG. 2, a region indicated by "BUSY" shows that the lens control CPU 11 has received a command from the camera body and is executing a process, and this is a low level. The camera control CPU 31, when it is confirmed that the signal line "CK" becomes a high level, performs the next communications after an elapse of a fixed time.

Next, examples of communications commands between the camera body and lens apparatus will be described.

In this embodiment, a command system is provided with reference to a camera side and is given in hexadecimal. DOH has not been set. 01H shows a command requesting to receive a lens ID code including data of image circle information, flange focal length information, a lens apparatus type, a product version, and functions. 02H shows a command requesting to receive AS optical data and AE optical data such as a focal length of an image taking lens, a full-aperture f-value of an image taking lens, AF sensitivity, an AF error correcting amount, a minimum aperture value, and a number of aperture steps. 03H shows a command to set a driving direction and speed of the focus driving motor 6. 04H shows a command to set a driving amount of a lens barrel 1. 05H shows a command to set a driving direction of the diaphragm driving motor 3. 06H shows a command to set a driving amount of the diaphragm 2. 07H shows a command to set a driving amount of the image blur correcting lens G2.

Next, focusing operation of the lens apparatus side will be described.

As a result of communications between the lens apparatus and camera body, data (hereinafter, referred to as AF optical data) concerning focus in a lens apparatus (in the lens control CPU 11 (memory 11a)) is obtained by the camera control CPU 31 of the camera body side. And, the camera control CPU 31 calculates a necessary moving amount of the focus lens based on the obtained AF optical data and an output (focusing condition) from the focus detector 30 and transmits this calculation result (focus lens moving amount) to the lens control CPU 11 of the lens apparatus side.

The lens control CPU 11 of the lens apparatus side drives the focus driving motor 6 via the motor control circuit 8. With a rotation of the focus driving motor 6, the focus lens inside the lens barrel 1 is moved in the optical axis direction by a rotation of the worm gear 7 attached to the rotation shaft of the focus driving motor 6.

To the rotation shaft, the pulse board 9 is attached so as to be integrally rotatable, and when the focus driving motor 6 rotates, the pulse board 9 also rotates. At this time, the photo interrupter 10 sends a signal to the lens control CPU 11 of the lens apparatus side every time a detecting light passes through a slit of the pulse board 9 (or every time a detecting light is blocked by the pulse board 9) And the lens control CPU 11 counts the input signal by using an internal pulse counter and thereby recognizes the number of rotation of the focus driving motor 6, that is, the moving amount of the focus lens When the focus lens is moved by the-focus lens moving amount transmitted from the camera control CPU 31 of the camera body side, the lens control CPU 11 stops rotation of the focus driving motor 6 via the motor control circuit 8 to complete focusing.

Next, diaphragm driving operation of the lens apparatus side will be described.

As a result of communications between the lens apparatus and camera body, the camera control CPU 31 of the camera body side obtains data (hereinafter, referred to as AE optical data) concerning the diaphragm 2 in the image taking lens 1a from the lens control CPU 11 (memory 11a) And, the camera control CPU 31 calculates an aperture diameter of the diaphragm 2 based on the obtained AE optical data and an output (object luminance information) of the photometric element 29 and transmits the calculated results to the lens control CPU 11 of the lens apparatus side.

The lens control CPU 11 of the lens apparatus side drives the diaphragm driving motor 3 via the diaphragm control circuit 5 and drives the diaphragm 2 so as to have an aperture diameter corresponding to a value set by the camera control CPU 31 of the camera body side.

Next, image blur correcting drive operation on the lens apparatus side will be described.

As a result of communications between the lens apparatus and camera body, the camera control CPU 31 of the camera body side obtains data (hereinafter, referred to as IS optical data) concerning an image blur correction in the image taking lens 1a from the lens control CPU 11 (memory 11a). And, the camera control CPU 31 calculates an image blur correcting drive amount, that is, a shifting amount of the image blur correcting lens G2 in a pitch direction and yaw direction, based on the obtained IS optical data and an output (a shake occurring in the camera body) from the vibration detecting section 56 and then transmits the calculated results to the lens control CPU 11 of the lens apparatus side.

The lens control CPU 11 of the lens apparatus side drives the image blur correcting motor 15 via the image blur correcting drive circuit 14 and shifts the image blur correcting lens G2 in a pitch direction and/or yaw direction by a shifting amount corresponding to a set value by the camera control CPU 31 of the camera body side.

Figure 3A:
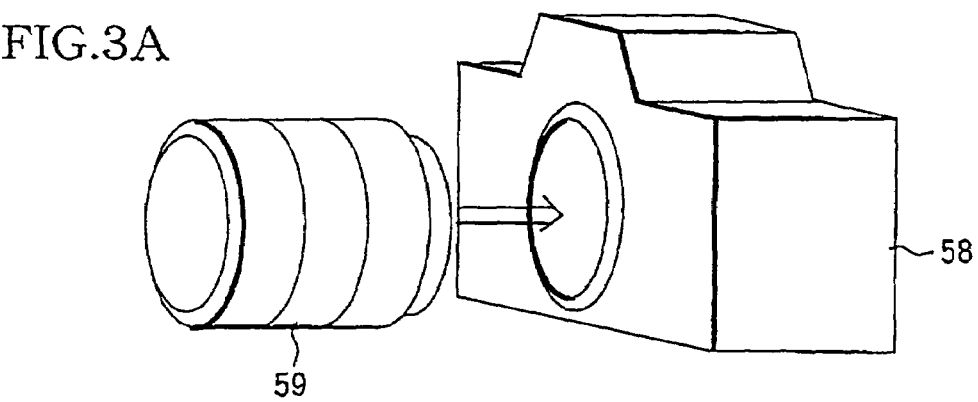
FIG. 3A and FIG. 3B are explanatory views when lens apparatuses having mutually different image circles are attached to the camera body.
Figure 3B:
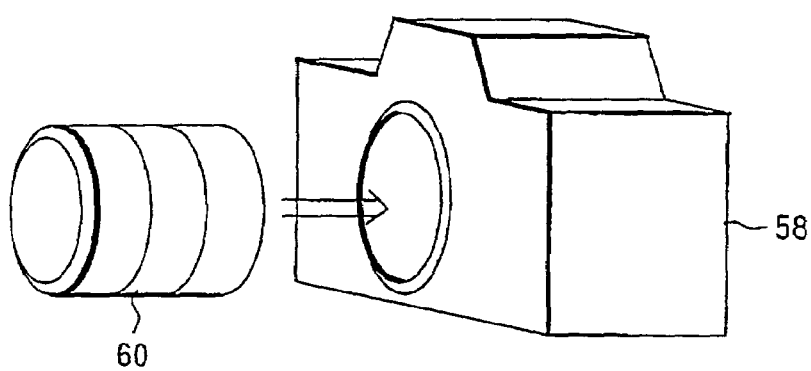

FIG. 3A is a view when a lens apparatus 59 having an image circle φ1 is attached to a camera body 58. FIG. 3B is a view when a lens apparatus 60 having an image circle φ2 is attached to a camera body 58. Herein, the relationship of image circles of the lens apparatuses 59 and 60 is in a relationship of the following expression (1).

$$\text{Image circle } +1 > \text{Image circle } +2 \qquad (1)$$

Figure 4:
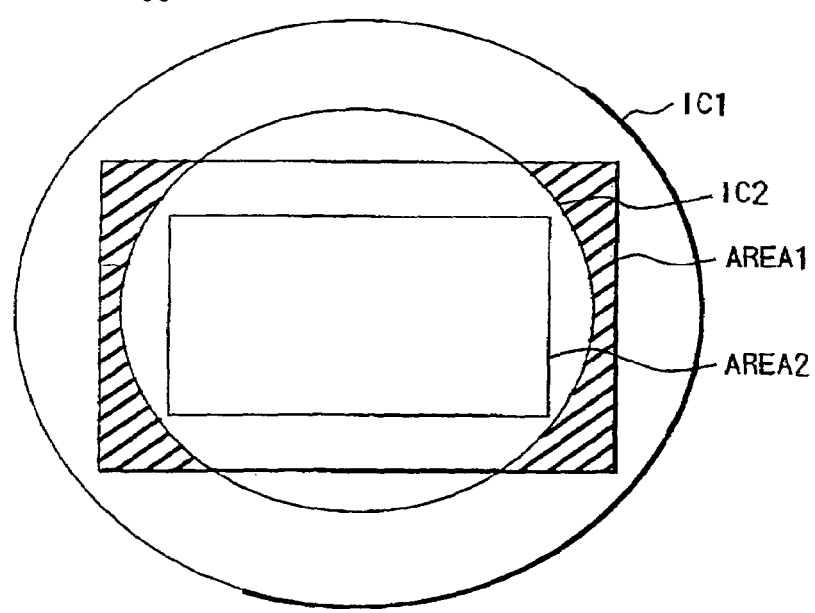
FIG. 4 is a view showing relationships between the image circle and recording image data dimensions

FIG. 4 is a view showing image circle dimensions on an image pickup plane of the image pickup element 41 and recording image data dimensions where the respective lens apparatuses 59 and 60 shown in FIG. 3A and FIG. 3B are attached to the camera body 58.

As shown in FIG. 3A, when the lens apparatus 59 having an image circle φ1 is attached to the camera body 58, an image circle "IC1" at the image pickup plane results in an image circle φ1. And in a region of the image circle "IC1", as shown in FIG. 4, a recording image data region "AREA1" for an image circle φ1 and a recording image data region "AREA2" for an image circle φ2 are included. Therefore, when the lens apparatus 59 is attached, image taking can be performed without an image deterioration with either recording-image data dimensions for the image circle φ1 or image circle φ2.

On the other hand, as shown in FIG. 3B, when the lens apparatus 60 having an image circle φ2 is attached to the camera body 58, an image circle "IC2" at the image pickup plane results in an image circle φ1.

Herein, image taking can be performed without an image deterioration when the recording image data dimensions are set as recording image data dimensions for the image circle φ2. However, when the recording image data dimensions are set as recording image data dimensions for the image circle φ1, an image deterioration is produced in regions (regions shown by diagonal lines in FIG. 4) positioned outside the image circle φ2 within the region of recording image data for the image circle φ1.

Therefore, the camera control CPU 31 obtains information concerning an image circle of the lens apparatus by communicating with the lens control CPU 11 and selects appropriate image data dimensions according to the obtained information, whereby image data without an image deterioration can be recorded.

Figure 5A:
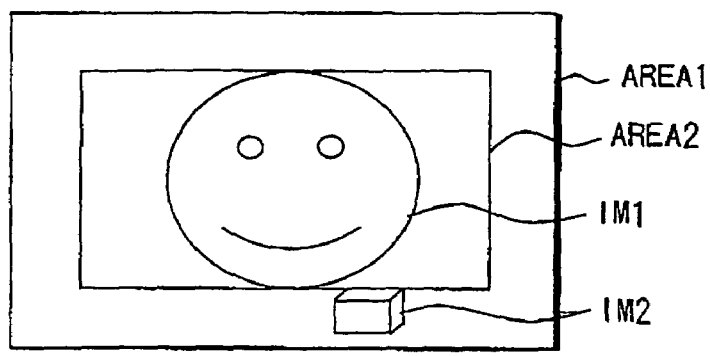
FIG. 5A is a view showing a relationship between the recording image data dimensions corresponding to the image circle and recording image.

FIG. 5A is a view showing an image on the image pickup plane. Here, although an image on the image pickup plane becomes an inverted image in some cases, for a comparative explanation with an image displayed in the display section 49, the image is represented as an erected image in FIG. 5A. As shown in FIG. 5A, in the recording image data region "AREA1" for an image circle φ1, images of a face "IM1" and a rectangular parallelepiped "IM2" are taken, while in the recording image data region "AREA2" for an image circle φ2, only an image of a face "IM1" is taken.

Figure 5B:
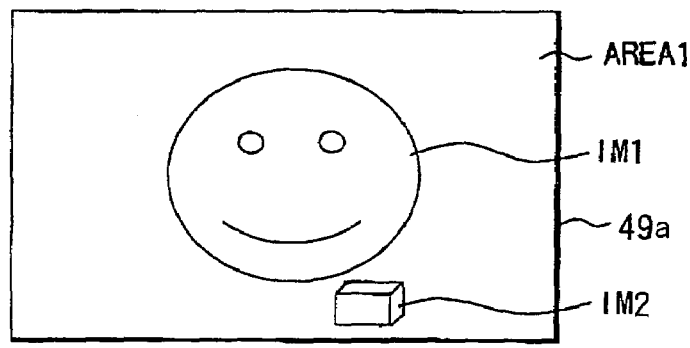
FIG. 5B through FIG. 5D are views showing displayed images in the display section.
Figure 5C:
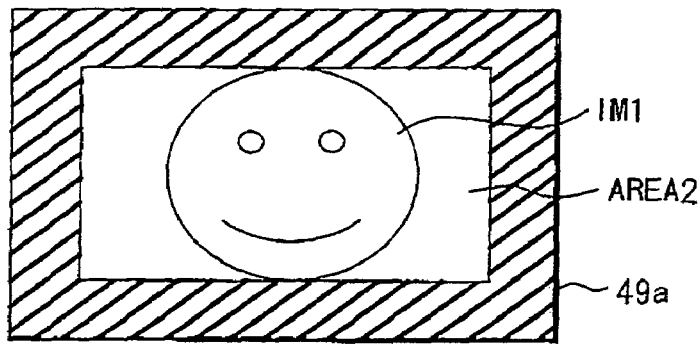
Figure 5D:
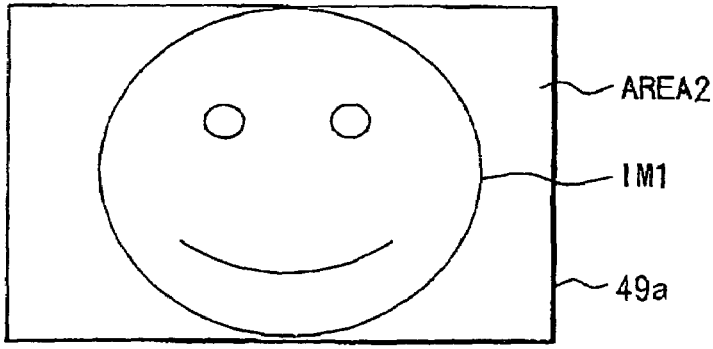

FIG. 5B through FIG. 5D are views showing images displayed in the display section 49.

Herein, FIG. 5B shows an image in a case where image taking is performed in the recording image data region "AREA1" for an image circle φ1 and the taken image is displayed in the display section 49. As described above, since images of the face "IM1" and rectangular parallelepiped "IM2" are included in the recording image data region "AREA1" for an image circle φ1, the images of the face "IM1" and rectangular parallelepiped "IM2" are also displayed in a display screen 49a of the display section 49, as well.

FIG. 5C shows an image in a case where image taking is performed in the recording image data region "AREA2" for an image circle φ2 and the taken image is displayed in the display section 49. Herein, as shown in FIG. 5A, only an image of the face "IM1" is included in the recording image data region "AREA2" for an image circle φ2, and an image of the rectangular parallelepiped "IM2" is positioned outside the region "AREA2". Therefore, only the image of the face "IM1" is displayed in the display section 49. And a peripheral region (a region shown by diagonal lines in FIG. 5c) of the recording image data region "AREA1" for an image circle φ1, excluding the recording image data region "AREA2" for an image circle φ2, is not displayed.

Here, it is also possible to display image-taking system operating information such as a shutter speed, an aperture value, etc., in the peripheral region. In addition, when the attached lens apparatus is a lens apparatus having an image circle φ1, it is also possible to display an image of the peripheral region darkly or lightly.

FIG. 5D shows an image in a case where image taking is performed in the recording image data region "AREA2" for an image circle φ2 and the taken image is displayed in the display section 49. In FIG. 5D, an image (image of the face "IM1") in the recording image data region "AREA2" for an image circle φ2 is, not displayed together with the peripheral region as in FIG. 5C, but is displayed, that is, displayed in an enlarged manner at the maximum size which can be displayed in the display section 49. Here, the size of a displayed image in the display section 49 is not necessarily the maximum size according to the display screen 49a of the display section 49 and can be any size as long as it can allow the user to view the displayed image in the display section 49 easily.

Figure 5E:
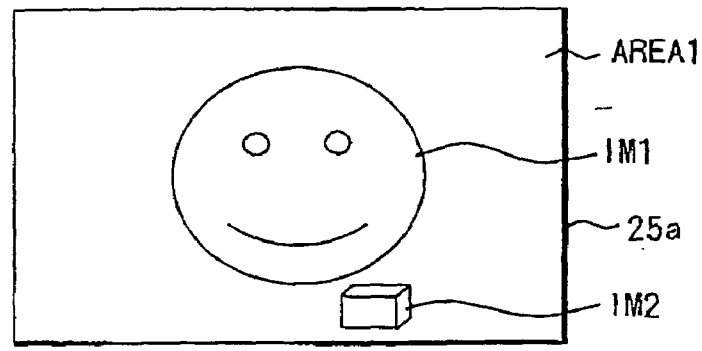
FIG. 5E through FIG. 5G are views showing displayed images in the optical view finder.
Figure 5F:
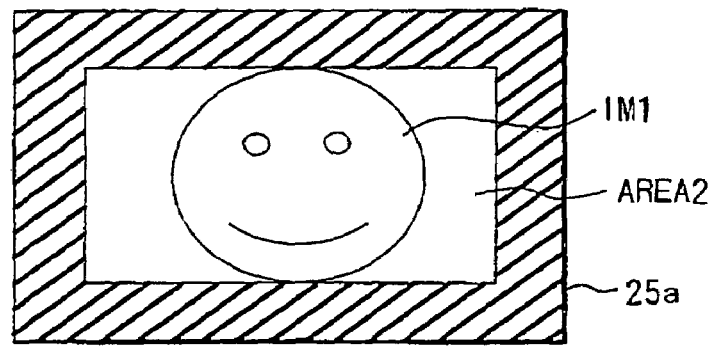
Figure 5G:
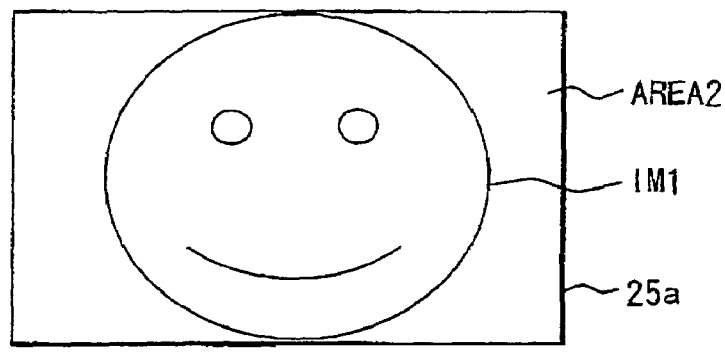

FIG. 5E through FIG. 5G are views showing images observed via the eyepiece 25, namely, images displayed in an optical view finder screen 25a.

FIG. 5E shows an image in the recording image data region "AREA1" for an image circle φ1, wherein images of the face "IM1" and rectangular parallelepiped "IM2" can be observed via the eyepiece 25. At this time, the visual field changing member 53 does not blocks an object light by entering into a finder light path, and an object image formed on the focusing screen 23 is directly guided to the eyepiece 25.

FIG. 5F shows an image in the recording image data region "AREA2" for an image circle φ2, wherein only an image of the face "IM1" can be observed via the eyepiece 25. At this time, by entering into the finder light path, the visual field changing member 53 blocks the peripheral region of an object light guided from the focusing screen 23 to the eyepiece 25. That is, the visual field changing member 53 blocks light in an region corresponding to a region (region shown by diagonal lines in FIG. 5F) of the recording image data region for an image circle φ1, excluding the recording image data region for an image circle φ2. Thereby, an image in a condition where the peripheral region has been blackened out can be observed via the eyepiece 25.

FIG. 5G shows an image in the recording image data region "AREA2" for an image circle φ2. The condition shown in FIG. 5G is a condition where only an image of the face "IM1" has been enlarged by a change in the angle of view at the eyepiece 25, not by making the visual field changing member 53 enter into the finder light path as described in FIG. 5F. Thereby, the user can observe an image shown in FIG. 5G via the eyepiece 25.

Figures 6A, 6B:
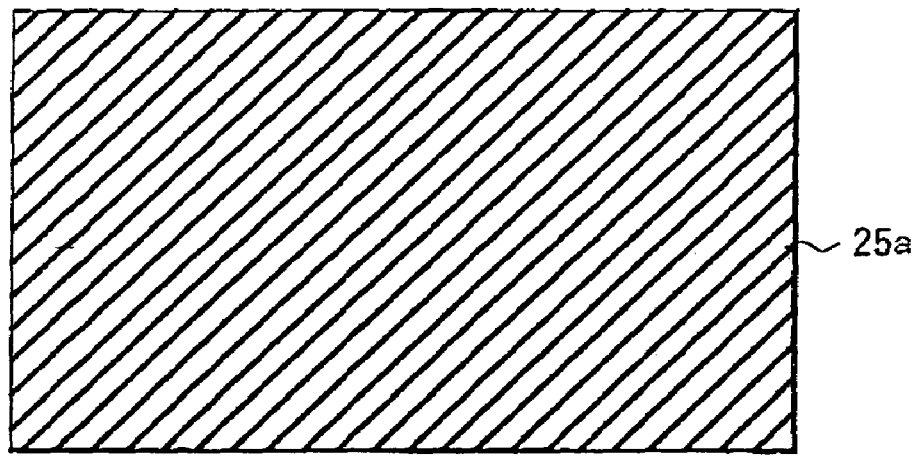
FIGS. 6A and 6B are views showing warning examples in the display section and optical view finder.

FIG. 6A is a view showing a warning display example in the display screen 49a of the display section 49. In the image-taking system of the present embodiment, in a case where the lens apparatus attached to the camera body has an image circle φ2 and where the recording image data region have been set for an image circle φ1, an instruction indicating that image taking is prohibited and setting of the recording image data region is incorrect is displayed.

FIG. 6B is a view showing a warning display example observed via the eyepiece 25. This condition is a condition where the visual field changing member 53 enters into the finder light path and nearly blocks all of the object light passing through the finder light path. In this case, the display screen of the optical finder has been darkened. Namely, in the image-taking system of the present embodiment, in a case where the lens apparatus attached to the camera body has an image circle φ2 and where the recording image data region is set for an image circle φ1, by bringing the visual field changing member 53 into the aforementioned condition, the user is informed that image taking is prohibited and setting of the recording image data region is incorrect.

Next, operations of the camera body side (camera control CPU 31) in the present embodiment will be described by use of flowcharts shown in FIG. 7A and FIG. 7B.

Operation is started from step S100, and first, in step S101, whether or not a lens apparatus is attached to the camera body is judged based on an output of the lens detecting section 39. Then, operation proceeds to step S102 when an attachment of a lens apparatus is confirmed, wherein a lens ID code of the attached lens apparatus is received by communicating with the lens control CPU 11.

Next, operation proceeds to step S103, wherein information concerning an image circle is received by communicating with the lens control CPU 11.

In the next step S104, which of the lens apparatuses having an image circle φ1 and an image circle φ2 is the attached lens apparatus is judged based on the information concerning an image circle received in step S103. Herein, when the received information concerning an image circle is of φ1, operation proceeds to step S105, wherein setting at the switch 57 is confirmed.

When this setting corresponds to an image circle φ1, operation proceeds to step S106, wherein the recording image data region are set to the dimensions corresponding to the image circle φ1. Thereby, the size of image data (dimensions of an image data region) obtained by the output of the image pickup element 41 and recorded in the nonvolatile memory 52 can be corresponded to the image circle φ1.

Herein, by specifying, out of all pixels of the image pickup element 41 (light receiving pixel region) which can receive an object light, a region of pixels (recording pixel region) from which charge accumulated signals are read out or after reading out charge accumulated signals from all pixels of the image pickup element 41 (light receiving pixel region), specifying a region (recording pixel region) according to recording image region, the recording image data region can be changed.

And, in step S107, by controlling drive of the display section 49, a display in the display section 49 is made into a display corresponding to the image circle φ1 as shown in FIG. 5B. In addition, the camera control CPU 31 performs drive control of the visual field changing member 53 via the visual field changing member driving section 54 so as to produce a display condition shown in FIG. 5E. Namely, the visual field changing member 53 is made into a condition retracted from the finder light path.

On the other hand, in step S105, when the setting of the switch 57 is a setting corresponding to the image circle φ2, this is judged to be a case where the user wants to shorten the image obtaining time or wants to conserve the capacity of the nonvolatile memory 52 or change the image taking angle of view, and operation proceeds to step S108, wherein the dimensions of the recording image data region are set to a value corresponding to the image circle φ2.

And, in step S109, by controlling drive of the display section 49, a display in the display section 49 is made into a display corresponding to the image circle φ2 shown in FIG. 5C or FIG. 5D. In addition, the camera control CPU 31 performs drive control of the visual field changing member 53 via the visual field changing member driving section 54 so as to produce a display condition (observing condition) shown in FIG. 5F or performs drive control of the eyepiece 25 via the variable power driving section 55 so as to produce a display condition (observing condition) shown in FIG. 5G.

Namely, the visual field changing member 53 is made to enter into the finder light path, or the eyepiece 25 is moved on the finder optical axis to change the angle of view in the finder optical system to a wide-angle side. Thereby, a display condition in the optical view finder can be made to conform to the image circle φ2.

On the other hand, in step S104, when the information concerning an image circle received in step S103 is φ2, operation proceeds to step S110, wherein a setting condition of the switch 57 is confirmed. Herein, when setting of the switch 57 corresponds to the image circle φ1, as described in FIG. 4, since image quality of the region not included in the image circle φ2 is deteriorated, operation proceeds to step S111 to give the user a warning.

Namely, in step S111, by performing drive control of the display section 49, the display section 49 is made to perform a display shown in FIG. 6A. This content of display is for informing the user that image taking is prohibited and the dimensions of the recording image data region should be set to a value corresponding to the image circle φ1. Here, any mode of display can be employed as long as the content can be understood.

In addition, the camera control CPU 31 performs drive control of the visual field changing member 53 via the visual field changing member driving section 54 so that a display in the optical view finder is made into a condition shown in FIG. 6B. Herein, it may also be possible to give the user a warning by changing the visual field changing member 53 within a predetermined time, namely, by changing the size of an image region displayed in the optical view finder. Here, in the present embodiment, a warning is given to the user by changing display conditions in the electronic view finder and optical view finder. It may be possible to given the user a warning by a voice, etc.

In step S110, when the setting of the switch 57 corresponds to the image circle φ2, operation proceeds to step S108, wherein the dimensions of the recording image data region are set to a value corresponding to the image circle φ2. Then, operation proceeds to step S109, as described above, a display in the display section 49 and a display in the optical view finder are made to conform to the image circle φ2.

In step S112, whether or not the switch SW1 is in an ON state is judged. Herein, when the switch SW1 is in an ON state, operation proceeds to step S113.

In step S113, the camera control CPU 31 obtains IS optical data by communicating with the lens control CPU 11. And, in a case where it is determined that the image blur correcting lens G2 has been fixed by the fixing mechanism 18 based on the obtained IS optical data, a command to release the fixing of the image blur correcting lens G2 and a command to shift the image blur correcting lens G2 to the initial position are transmitted to the lens control CPU 11. Thereby, on the lens apparatus side, as will be described later (see FIG. 8A and FIG. 8B), the image blur correcting lens G2 is shifted so that the center of the image blur correcting lens G2 reaches the initial position in the vicinity of the optical axis, and an image blur correcting operation is started.

In step S114, the camera control CPU 31 performs a photometric operation based on AE optical data of the lens apparatus stored in the lens apparatus (memory 11a) or the camera body (memory 31a) and an output of the photometric element 29. Based on a result obtained by this photometric operation, the camera control CPU 31 performs a calculation of an exposure value (a shutter speed, an aperture value, etc.)

Subsequently, in step S115, the camera control CPU 31 calculates a moving amount and a moving direction of the focus lens in the lens barrel 1 based on AF optical data of the lens apparatus and an output from the focus detector 30, and this calculation information is transmitted to the lens control CPU 11. Thereby, on the lens apparatus side, the focus lens is moved to perform a focusing operation based on the information concerning the focus driving transmitted from the camera control CPU 31. Here, as this focusing operation, an operation by a phase difference detecting method or contrast detecting method is performed.

In step S116, whether or not the switch SW2 is in an ON state is judged, and when the switch SW2 is not in an ON state, operation returns to step S112. On the other hand, when the switch SW2 is in an ON state, operation proceeds to step 3117, wherein the exposure value information (aperture value) obtained in step S114 is transmitted to the lens control CPU 11. Thereby, on the lens apparatus side, drive control of the diaphragm 2 is performed so as to have the transmitted aperture value.

In step S118, the camera control CPU 31 makes the shutter 26 perform an opening operation via the shutter drive circuit 27. Thereby, an exposure of the image pickup element 41 is started. And, in step S119, after an elapse of a necessary exposure time, the shutter 26 is made to perform a closing operation via the shutter drive circuit 27. Thereby, the exposure of the image pickup element 41 is completed. The aforementioned opening and closing operations of the shutter 26 is performed based on the shutter speed obtained in step S114.

In step S120, the camera control CPU 31 receives, by communicating with the lens control CPU 11, lens information at a zooming position and a focusing position during release operation and data for image processing. And, in step S121, an image processing is performed by use of the data for image processing obtained in step S120, and the image data is recorded in the nonvolatile memory 52.

In step S122, whether or not sufficient capacity for recording the image data remains in the nonvolatile memory 52 is judged, and when sufficient capacity remains, operation returns to step S112. On the other hand, when sufficient capacity does not remain, operation proceeds to step S123. In step 3123, a command to shift the image blur correcting lens G2 in the lens barrel 1 to the initial position and a command to fix the image blur correcting lens G2 by the fixing mechanism 18 are transmitted to the lens control CPU 11. Thereby,, on the lens apparatus side, as will be described later, operations according to the contents of transmission are performed.

In step S124, a warning to the effect that no sufficient capacity remains is given to the user by a display in the display section 49 or voice, and the main flow is finished in step S125.

Figure 8A:
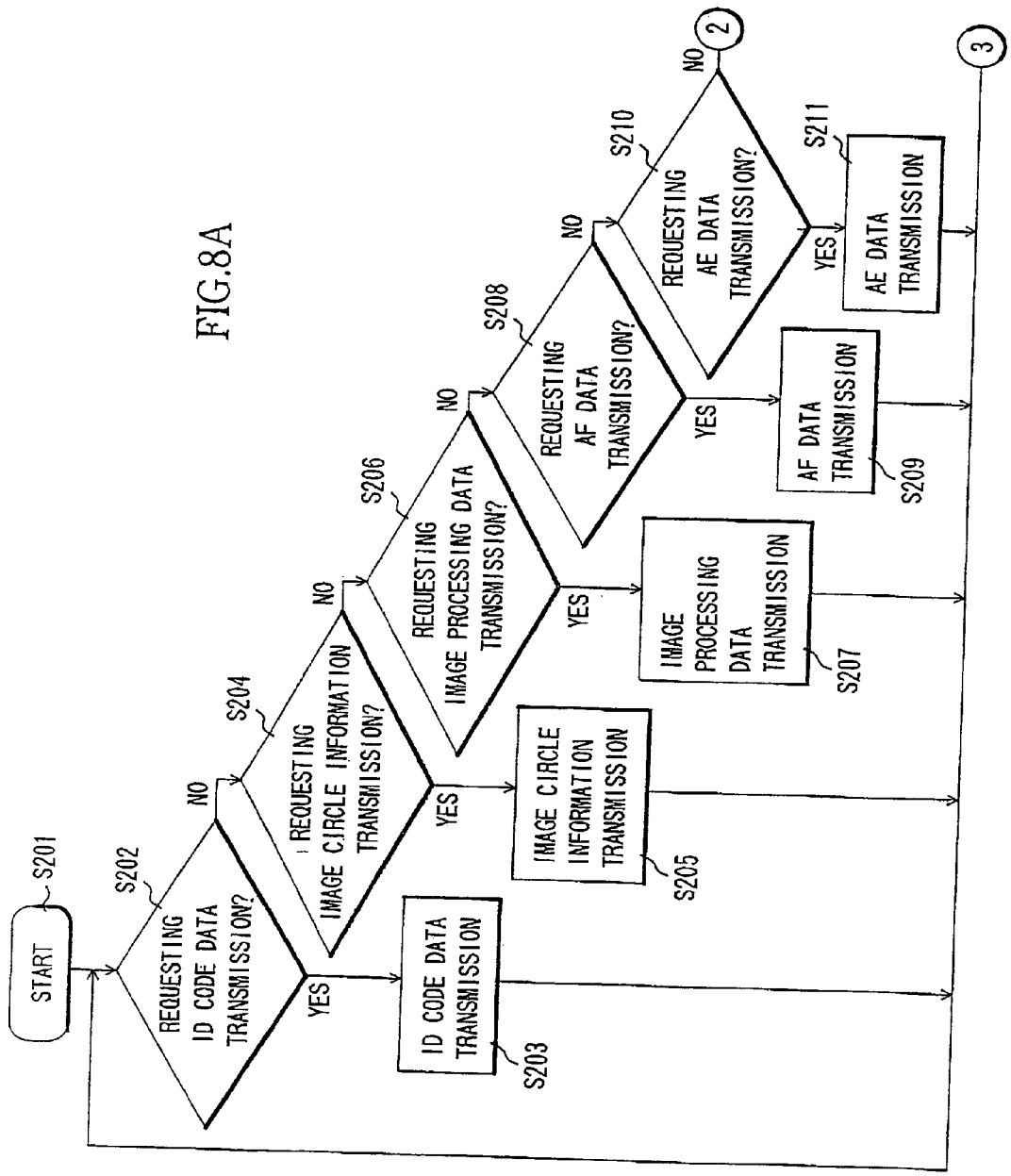
FIGS. 8A and 8B are flowcharts showing operations at the lens apparatus side in Embodiment 1.
Figure 8B:
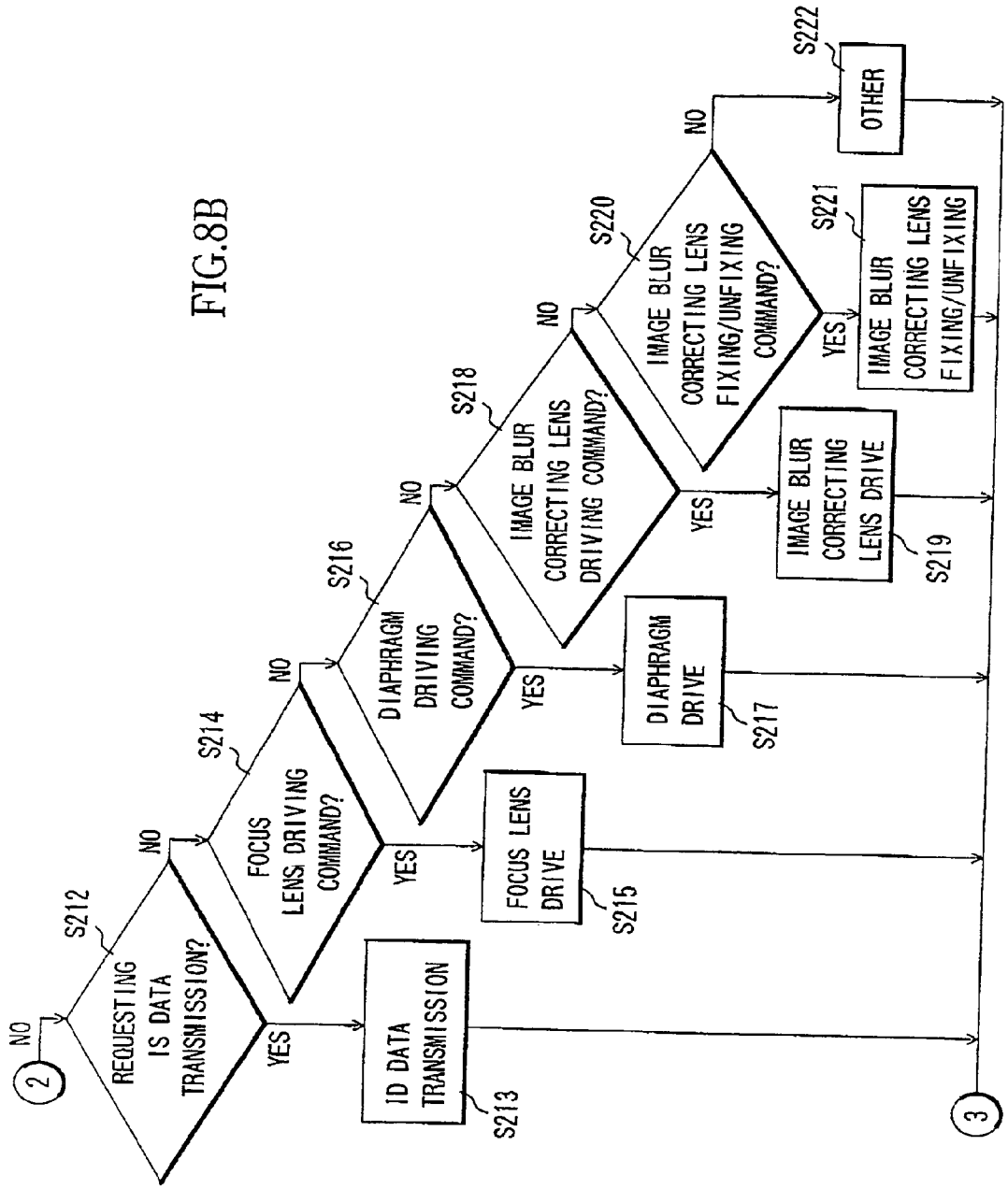

Next, operations of the lens apparatus side (lens control CPU 11) which has received a command from the camera body will be described by use of flowcharts in FIG. 8A and FIG. 8B.

When a command transmitted from the camera body is received, the lens control CPU 11 of the lens apparatus side starts operation from step S201, and in step S202 onward, the command from the camera body is analyzed.

First, in step S202, whether or not the command from the camera body is a command in the aforementioned step S102 of FIG. 1A, namely, whether or not the command indicates a command requesting to transmit lens ID code data including a lens type and characteristics such as presence/absence of an image blur correcting function in the lens apparatus is judged. When it is a request to transmit lens ID code data, operation proceeds to step S203, and lens ID code data is transmitted to the camera body. Thereafter, operation returns to step S202.

On the other hand, when the command to the lens apparatus is not a command requesting to transmit lens ID code data in step S202, operation proceeds to step S204. In step S204, whether or not the command from the camera body is a command in the aforementioned step S103 of FIG. 7A, namely, whether or not the command indicates a command requesting to transmit information concerning an image circle is judged, and if so, operation proceeds to step S205, wherein information concerning an image circle is transmitted to the camera body. Thereafter, operation returns to step S202.

When it is judged in step S204 that the command to the lens unit is not a command requesting to transmit information concerning an image circle, operation proceeds to step S206. In step S206, whether or not the command from the camera body is a command in the aforementioned step S120 of FIG. 7B, namely, whether or not the command indicates a command requesting to transmit image processing optical data is judged, and if so, operation proceeds to step S207, wherein image processing optical data is transmitted to the camera body. Thereafter, operation returns to step S202.

When it is judged in step S206 that the command is not a command requesting to transmit image processing optical data, operation proceeds to step S208. In step S208, whether or not the command from the camera body is a command in the aforementioned step S115 of FIG. 78, namely, whether or not the command is a command requesting to transmit AF optical data is judged, and if so, operation proceeds to step S209, wherein AF optical data is transmitted to the camera body. Thereafter, operation returns to step S202.

When it is judged in step S208 that the command is not a command requesting to transmit AF optical data, operation proceeds to step S210. In step S210, whether or not the command from the camera body is a command in the aforementioned step S114 of FIG. 7B, namely, whether or not the command is a command requesting to transmit AE optical data is judged, and if so, operation proceeds to step S211, wherein RE optical data is transmitted to the camera body. Thereafter, operation returns to step S202.

When it is judged in step S210 that the command is not a command requesting to transmit AE optical data, operation proceeds to step S212. In step S212, whether or not the command from the camera body is a command in the aforementioned step S113 of FIG. 7B, namely, whether or not the command indicates a command requesting to transmit IS optical data is judged, and if so, operation proceeds to step S213, wherein IS optical data is transmitted to the camera body. Thereafter, operation returns to step S202.

When it is judged in step S212 that the command is not a command requesting to transmit IS optical data, operation proceeds to step S214. In step S214, whether or not the command from the camera body is a command in the aforementioned step S115 of FIG. 7E, namely, whether or not the command indicates a focus driving command is hedged, and if so, operation proceeds to step S215. In step S215, as described above, based on an instructional command of a moving amount and a moving direction of the focus lens from the camera body, the focus lens is driven. Thereafter, operation returns to step S202.

When it is judged in step S214 that the command is not a focus driving command, operation proceeds to step S216. In step S216, whether or not the command is a driving command for the diaphragm 2 is judged, and if so, operation proceeds to step S217. In step S217, based on an instructional command of a diaphragm amount and a diaphragm direction of the diaphragm 2 from the camera body, the diaphragm 2 is driven. Thereafter, operation returns to step S202.

When it is judged in step S216 that the command is not a driving command for the diaphragm 2, operation proceeds to step S218. In step S218, whether or not the command from the camera body is a command in the aforementioned steps S113 and S123 of FIG. 7I, namely, whether or not the command is an image blur correcting lens driving command is judged, and if so, operation proceeds to step S219. In step S219, as described above, based on an instructional command of a shifting amount and a shifting direction of the image blur correcting lens from the camera body, the image blur correcting lens is driven. Thereafter, operation returns to step S202.

Figure 7A:
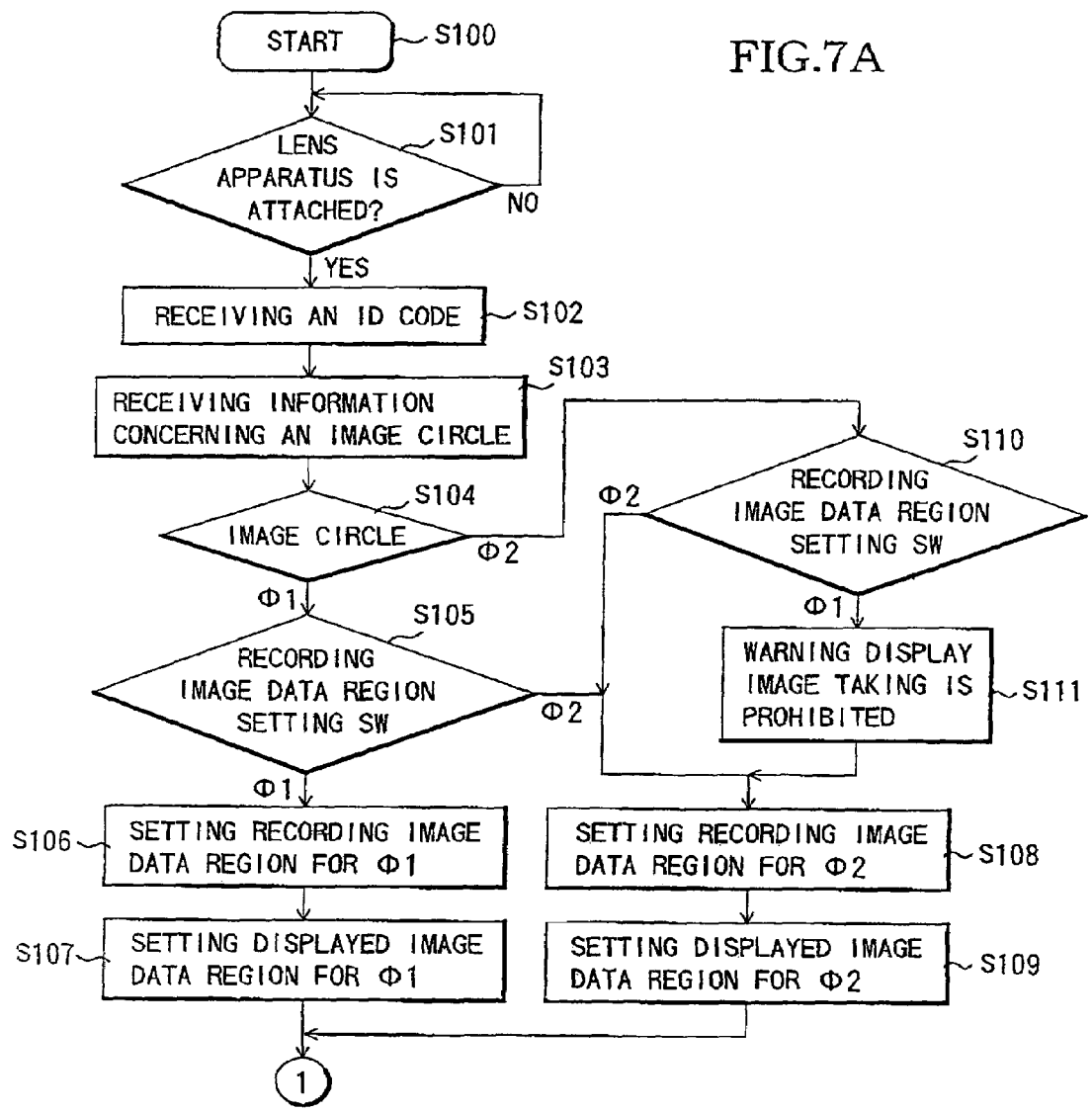
FIGS. 7A and 7B are flowcharts showing operations at the camera body side in Embodiment 1.
Figure 7B:
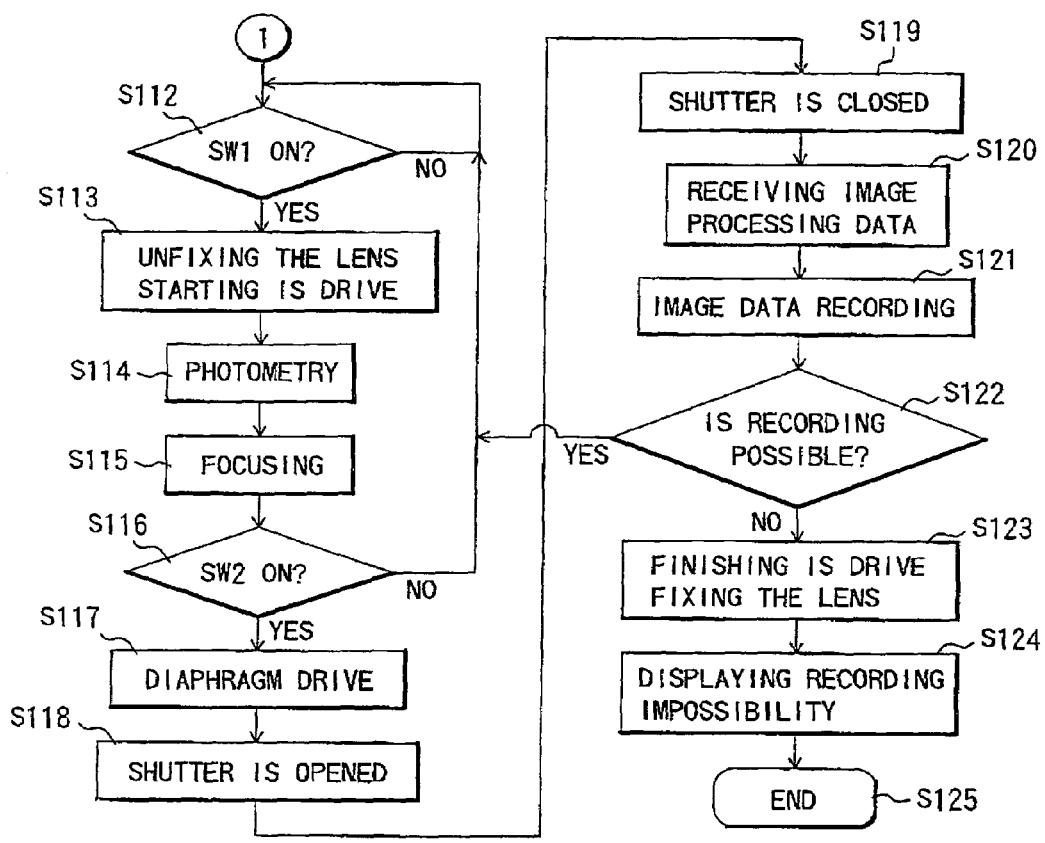

When it is judged in step S218 that the command is not an image blur correcting lens driving command, operation proceeds to step S220 In step S220, whether or not the command from the camera body is a command in the aforementioned steps S113 and S123 of FIG. 7B, namely, whether or not the command is a fixing command and a fixing release command for an image blur correcting lens G2 (fixing mechanism driving commands) is judged, and if so, operation proceeds to step S221. In step S221, the fixing mechanism 18 of the image blur correcting lens G2 is driven in accordance with an instructional command to fix or unfix the image blur correcting lens G2. Thereafter, operation returns to step S202.

When it is judged in step S218 that the command is not the fixing mechanism driving commands, operation proceeds to step S222. In step S222, when the command from the camera body is a command other than the aforementioned commands, for example, a command requesting to transmit another optical information, this optical information is transmitted to the camera body. Thereafter, operation returns to step S202.

According to the image-taking system of the present embodiment, even if a lens apparatus different in the image circle is attached, the user can set recording image data region without making a mistake.

Embodiment 2

Figure 9:
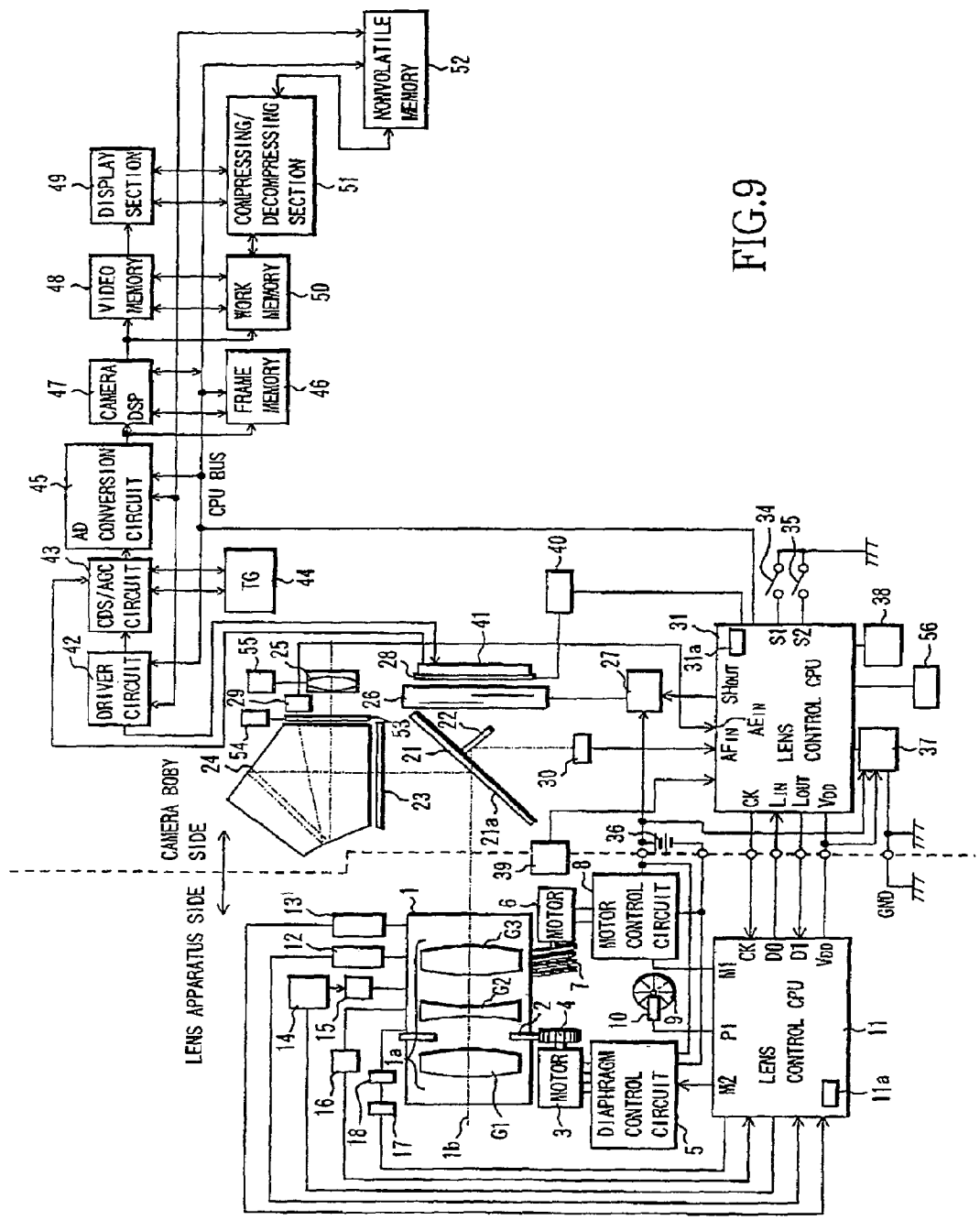
FIG. 9 shows a block diagram of a image-taking system, which is Embodiment 2 of the present invention.
Figure 10A:
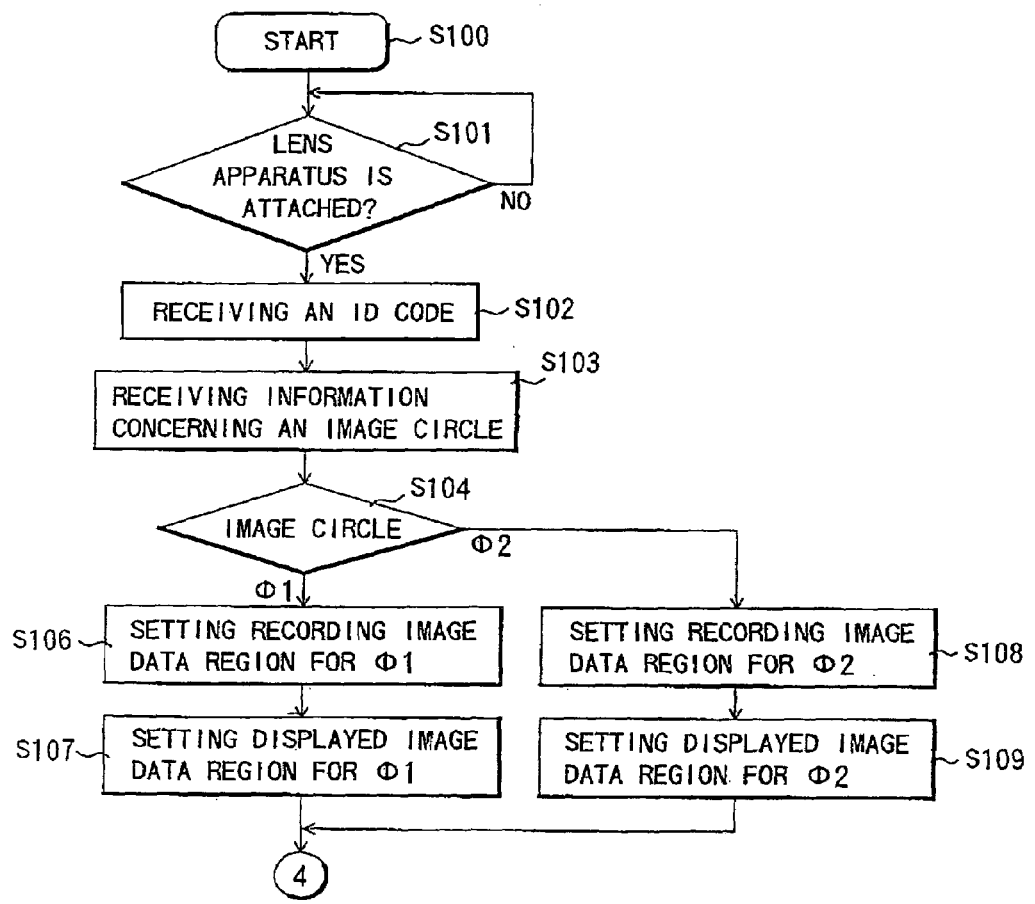
FIGS. 10A and 10B are flowcharts showing operations at the camera body side in Embodiment 2.
Figure 10B:
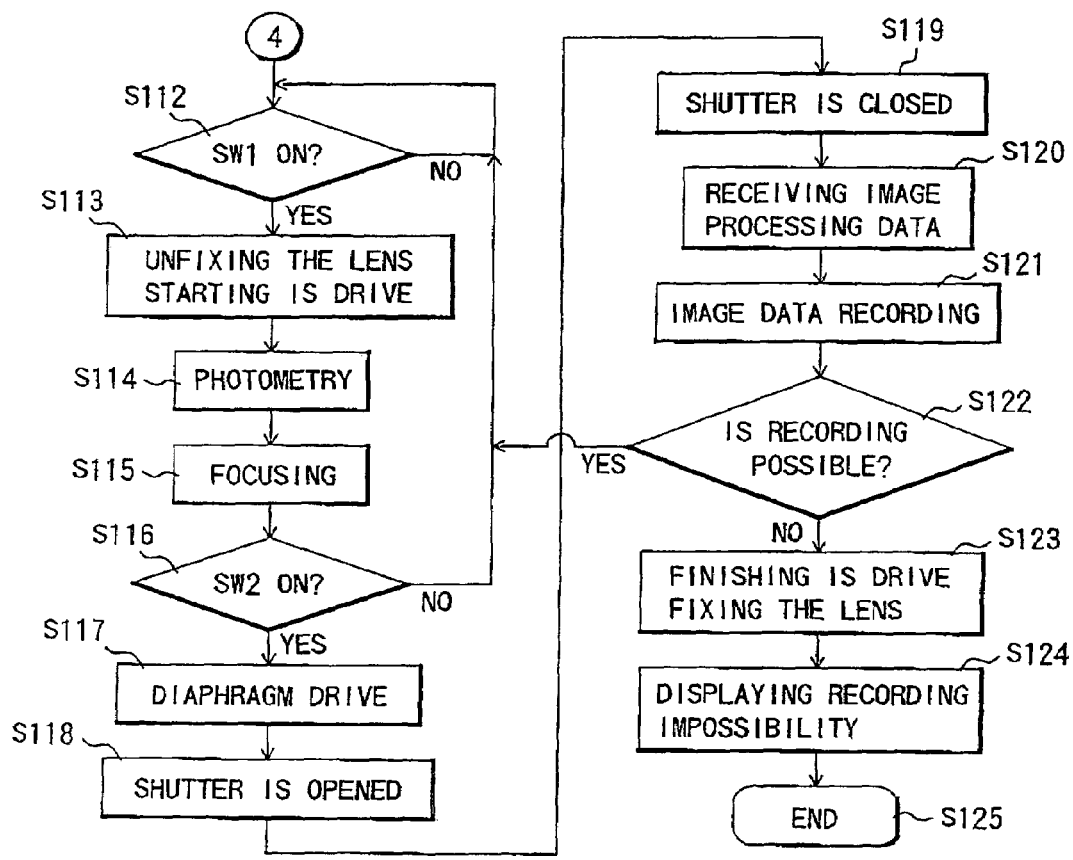

Next, an image-taking system which is Embodiment 2 of the present invention will be described by use of FIG. 9, FIG. 10A and FIG. 10B. FIG. 9 is a view showing a structure of the image-taking system of the present embodiment, wherein identical symbols are used for members the same as members described in Embodiment 1. FIG. 10A and FIG. 10B are flowcharts showing operations at the camera body side (camera control CPU 31) in the present embodiment.

The image-taking system of the present embodiment is provided, as shown in FIG. 9, by eliminating the switch 57 for setting the dimensions of the recording image data region from the image-taking system structure of Embodiment 1, while other aspects of the structure are the same as those of Embodiment 1.

Namely, in Embodiment 1, the dimensions of the recording image data region are set (set by a user's operation) in accordance with an operation of the switch 57. On the other hand, in the present embodiment, the dimensions of the recording image data region are automatically set in accordance with a lens apparatus (image circle) attached to the camera body.

Concretely, as shown in FIG. 3A, when the lens apparatus 59 having an image circle φ1 is attached to the camera body 58, the dimensions of the recording image data region are automatically set to a value corresponding to the image circle φ1. Similarly, when the lens apparatus 60 having an image circle φ2 is attached to the camera body 58, the dimensions of the recording image data region are automatically set to a value corresponding to the image circle φ2. By automatically setting the dimensions of the recording image data region as such, a user is not bothered by setting of the recording image data region, whereby usability of the image-taking system can be improved.

Accordingly, in operations of the camera control CPU 31 of the present embodiment, operations in steps S105, S110, and S111 out of the operations described in FIG. 7A and FIG. 7B of Embodiment 1 are eliminated.

Hereinafter, in the flowcharts shown in FIG. 10A and FIG. 10B, characteristic parts (step S104 to step S109) of the present embodiment will be described. Herein, operations other than the operations described in the following are the same operations as the operations shown in FIG. 7A and FIG. 7B described in Embodiment 1, and identical symbols are used for the same steps.

In step S104, which of φ1 and φ2 the image circle of the lens apparatus attached to the camera body has is judged based on the information concerning an image circle obtained in step S103. Herein, when it is an image circle φ1, operation proceeds to step S106, the dimensions of the recording image data region are set to a value corresponding to the image circle φ1.

And, operation proceeds to step S107, the camera control CPU 31 performs drive control of the display section 49 so as to produce a display condition shown in FIG. 5B. In addition, the camera control CPU 31 performs drive control of the visual field changing member 53 via the visual field changing member driving section 54 so that a display condition in the optical view finder is made into a condition shown in FIG. 5E. Thereby, displays in the display section 49 and optical view finder are made to conform to the image circle φ1.

On the other hand, in step S104, when the information concerning an image circle received in step S103 is of an image circle φ2, operation proceeds to step S108, wherein the dimensions of the recording image data region are set to a value corresponding to the image circle φ2.

And, in step S109, the camera control CPU 31 performs drive control of the display section 49 so as to produce a display condition shown in FIG. 5C or 5D. In addition, the camera control CPU 31 performs drive control of the visual field changing member 53 via the visual field changing member driving section 54 so that a display condition in the optical view finder is made into a condition shown in FIG. 5F or performs drive control of the eyepiece 25 via the variable power driving section 55 so that a display condition in the optical view finder is made into a condition shown in FIG. 5G.

Thereby, a display condition in the optical view finder is made to conform to the image circle φ2.

Embodiment 3

Next, an image-taking system which is Embodiment 3 of the present invention will be described by use of FIG. 11A through FIG. 14B. A structure of the image-taking system of the present embodiment is the same as the structure of the image-taking system (FIG. 1) of Embodiment 1, and description for identical members is omitted by using identical symbols.

Figure 11A:
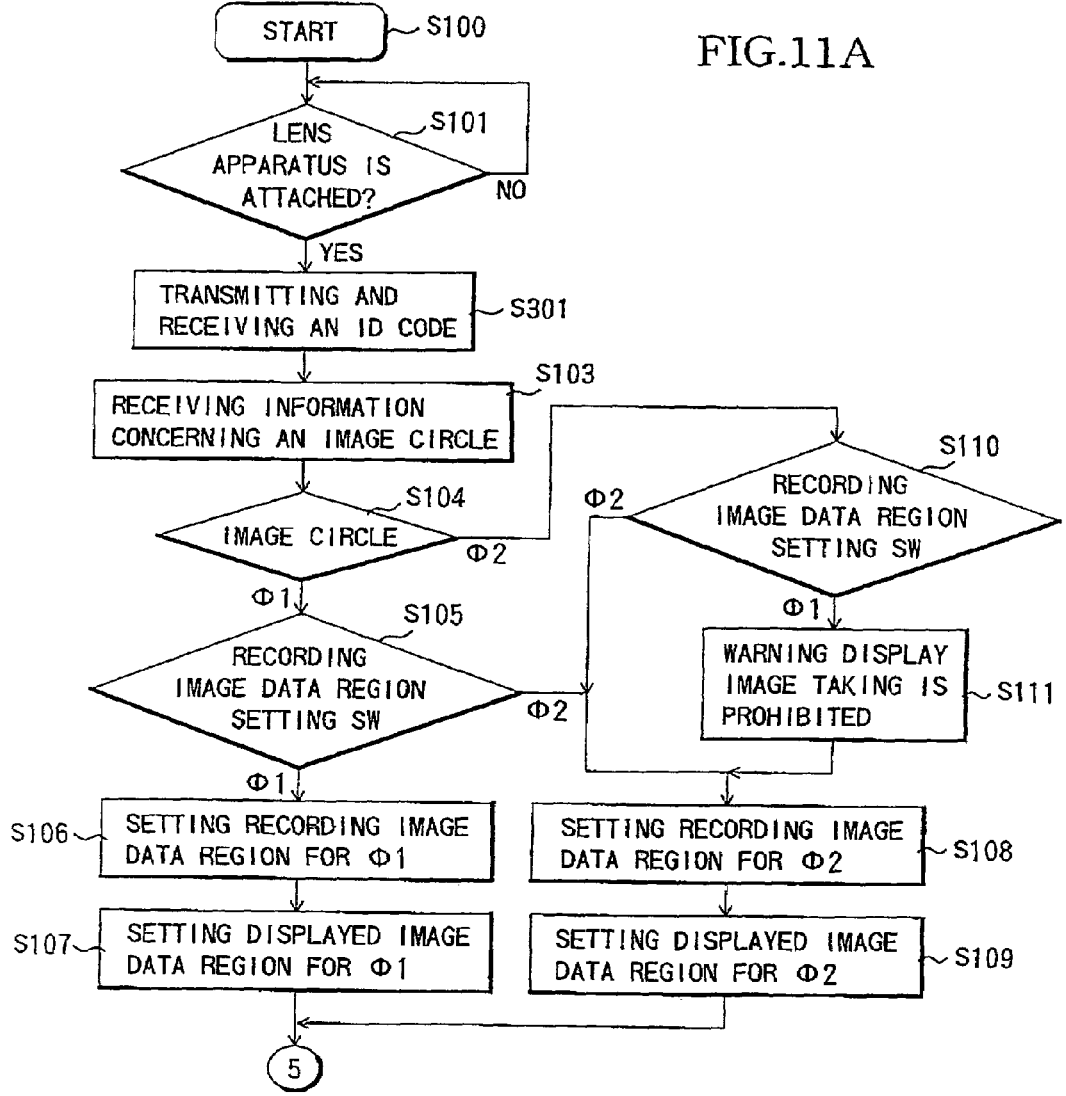
FIGS. 11A and 11B are flowcharts showing operations at the camera body side in Embodiment 3.
Figure 11B:
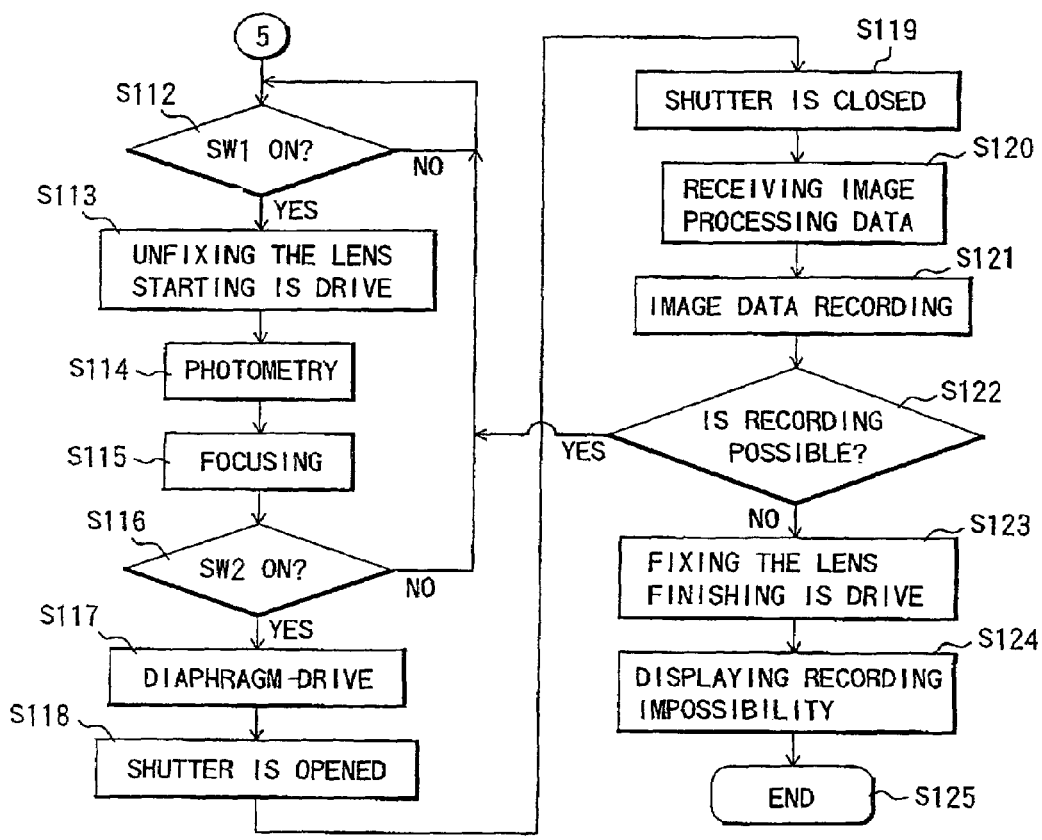

FIG. 11A and FIG. 11B are flowcharts showing operations of the camera control CPU 31 in the present embodiment, wherein a case where the camera control CPU 31 has a camera ID code including information concerning a camera type, a shutter speed, and a shutter structure in the memory 31a is shown. Operations shown in FIG. 11A and FIG. 11B are operations wherein the operation in the aforementioned step S102 of FIG. 7A is changed, and since other operations are the same as those of FIG. 7A and FIG. 7B, description for the same steps is omitted by using identical symbols.

In step S301 of FIG. 11A, the camera control CPU 31 receives lens ID code data and transmits camera ID code data by communicating with the lens control CPU 11.

Figure 12A:
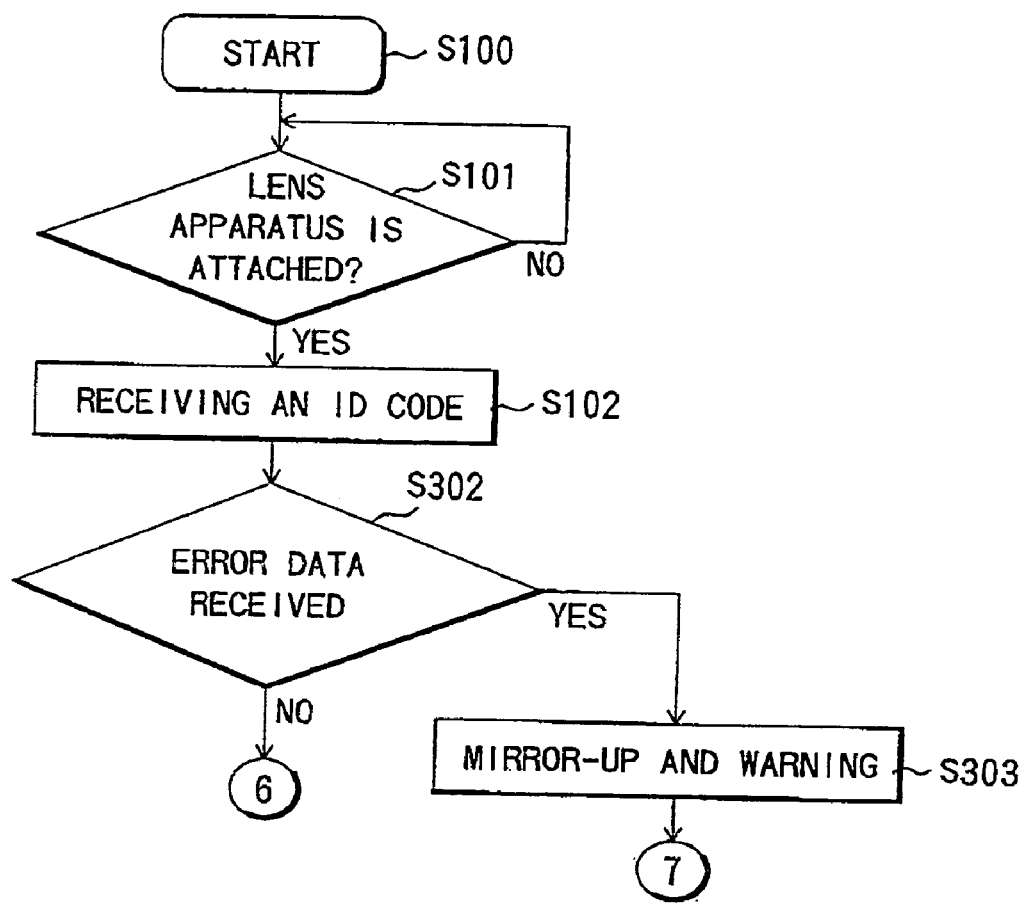
FIGS. 12A and 12B are flowcharts showing operations at the camera body side in a modification of Embodiment 3.
Figure 12B:
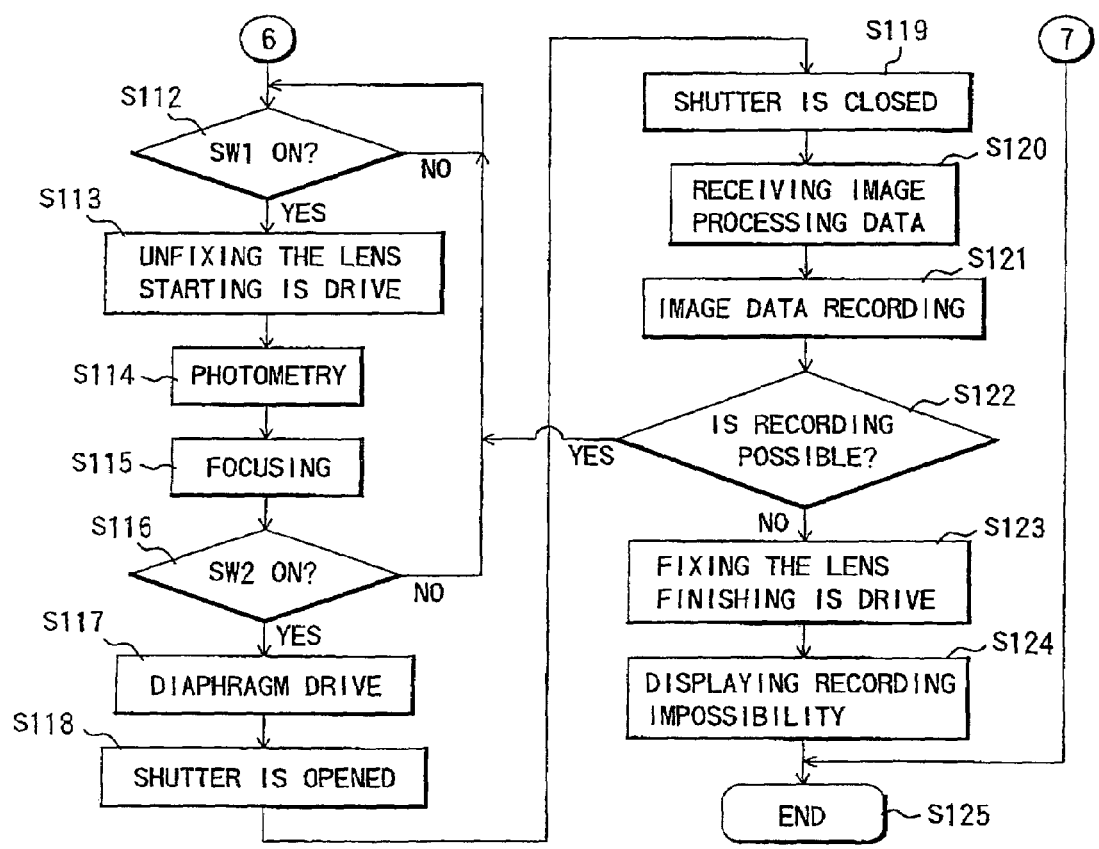

FIG. 12A and FIG. 12B are flowcharts showing operations of the camera control CPU 31 in a modification of the present embodiment, wherein a case where the camera control CPU 31 does not have a camera ID code is shown. In FIG. 12A and FIG. 12B, steps S103 through S111 are eliminated from the flowcharts shown in FIG. 7A and FIG. 7B, and steps S302 and S303 are added. Here, since other steps of FIG. 12A and FIG. 12B are the same as those of FIG. 7A and FIG. 7B, description thereof is omitted by using identical symbols.

In step S302 of FIG. 12A, the camera control CPU 31 judges, as will be described later, whether or not error data is received from the lens control CPU 11. When error data is received, operation proceeds to step S303, and if not, operation proceeds to step S112.

In step S303, the camera control CPU 31 retracts the main mirror 21 from the image taking light path via a mirror drive mechanism (not shown), and gives a user a warning by displaying that image taking operation is prohibited in the display section 49. Herein, when the main mirror 21 has been retracted from the image taking light path, since observation of an object image via the eyepiece 25 is impossible, the user recognizes that a warning is given based on the display in the display section 49.

Figure 13A:
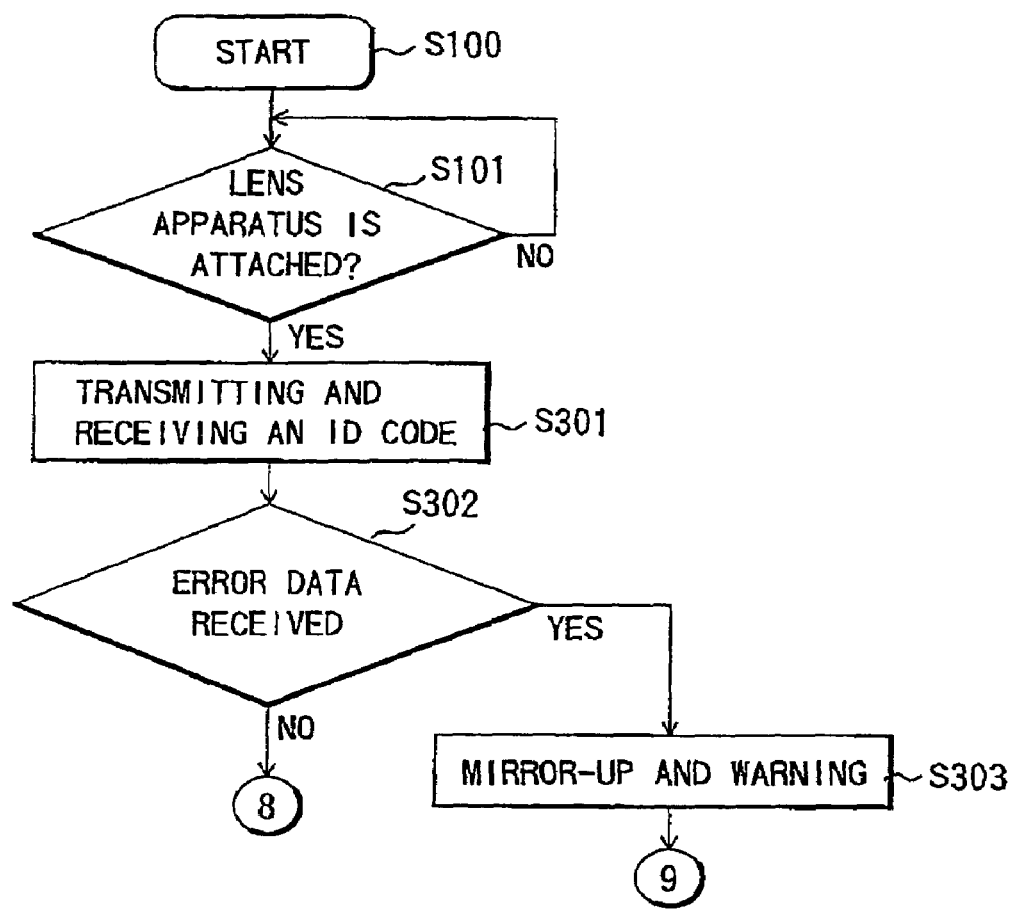
FIGS. 13A and 13B are flowcharts showing operations at the camera body side in Embodiment 3.
Figure 13B:
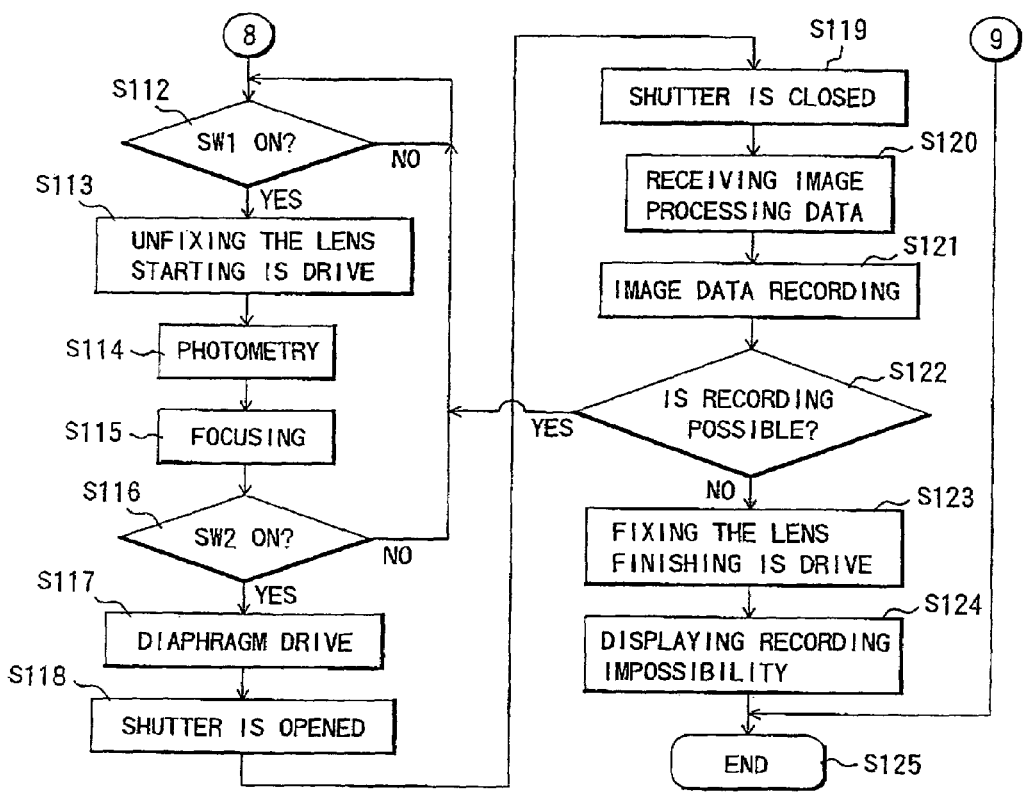

After a warning is given in step 303, operation proceeds to step S125, wherein the main processing is finished FIG. 13A and FIG. 133 are flowcharts showing operations of the camera control CPU 31 in a modification of the present embodiment, and a case where the recording image data region cannot be changed in the camera body although the camera control CPU 31 has a camera ID code is shown. In FIG. 13A and FIG. 13B, steps S103 through S111 are eliminated from the flowcharts shown in FIG. 11A and FIG. 11B, and steps S302 and S303 are added. Here, since other steps of FIG. 13A and FIG. 133 are the same as those of FIG. 11A and FIG. 11B, description thereof is omitted by using identical symbols.

In step S302 of FIG. 13A, the camera control CPU 31 judges, as will be described later, whether or not error data is received from the lens control CPU 11, and when error data is received, operation proceeds to step S303, and if not, operation proceeds to step S112.

In step S303, the camera control CPU 31 retracts the main mirror 21 from the image taking light path via a mirror drive mechanism (not shown), and gives a user a warning by displaying that image taking operation is prohibited in the display section 49. Herein, when the main mirror 21 has been retracted from the image taking light path, since observation of an object image via the eyepiece 25 is impossible, the user recognizes that a warning is given based on the display in the display section 49.

After a warning is given in step 303, operation proceeds to step S125, wherein the main processing is finished.

Figure 14A:
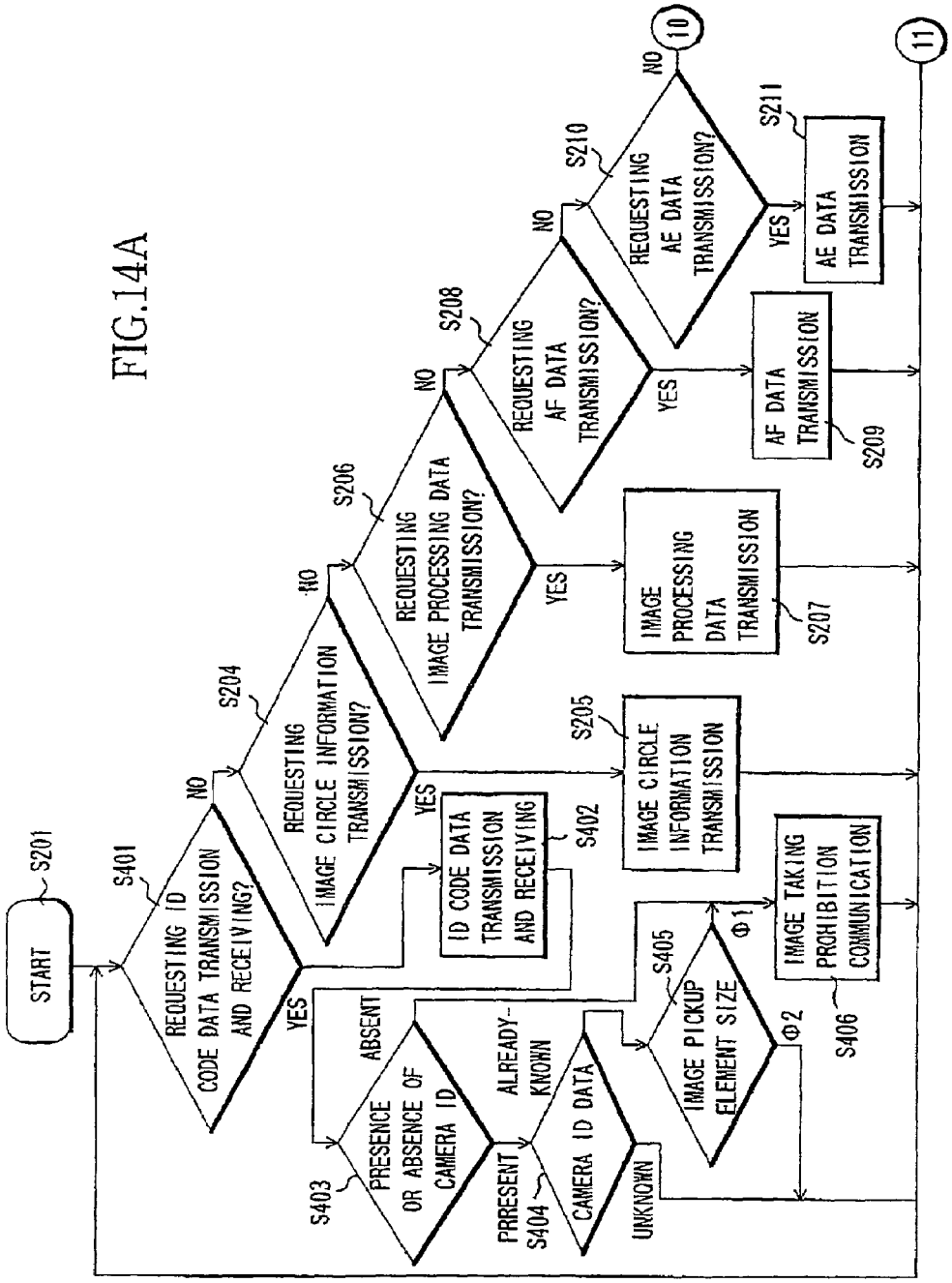

FIG. 14A and FIG. 14B are flowcharts showing operations of the lens control CPU 11 in a lens apparatus having an image circle 100 2. In the flowcharts of FIG. 14A and FIG. 14B, step S401 and step S402 are added in place of step S202 and step S203 of FIG. 8A and FIG. 8B, and step S403 through S406 are added. Here, since operations in other steps are the same as the operations described in FIG. 8A and FIG. 8B, description thereof is omitted by using identical symbols.

In step S401 of FIG. 14A, the lens control CPU 11 judges whether or not the command from the camera body (camera control CPU 31) is a command in step S301 of FIG. 11A. Namely, whether or not the command indicates a command requesting to receive camera ID code data and a command requesting to transmit lens ID code data is judged, and if so, operation proceeds to step S402, wherein camera ID code data is received and lens ID code data is transmitted to the camera body side.

In step S403, it is judged whether or not camera ID code data is presence. Herein, when the camera ID code data is not received, namely, when the lens apparatus is attached to the camera having no camera ID code shown in FIG. 12A and FIG. 12B, since the dimensions of the recording image data region at the camera body side are unclear, by transmitting, to the camera control CPU 31, data indicating that an image taking operation is prohibited in step S405, recording of a deteriorated image is prevented.

For example, by transmitting data (error data) which indicates an error to the camera control CPU 31, the camera control CPU 31 retracts the main mirror 21 from the image taking light path, as described in steps S302 and S303 of FIG. 12A and FIG. 13A, and performs a display that an image taking operation is prohibited in the display section 49.

On the other hand, when the camera ID code data is present in step 8403, it becomes possible to judge the type of camera body on which a lens apparatus is attached.

In step S404, whether or not the transmitted camera ID code data is already-known data, namely, whether or not the data is camera ID code data recorded in the memory 11a of the lens control CPU 11 is judged. Herein, when the transmitted camera ID code data is camera ID code data which the lens control CPU 11 has, since the size of the image pickup element 41 in the camera body can be judged based on this camera ID code data, operation proceeds to steps S405.

In step S405, based on information corresponding to the received camera ID code data out of information stored in the memory 11a of the lens control CPU 11, it is judged that the size of the image pickup element 41 in the camera body to which a lens apparatus is attached. Herein, when the size of the image pickup element 41 is a size corresponding to an image circle φ1, since an image circle of the attached lens apparatus is φ2, and as described in FIG. 4, and parts where an image deterioration is produced occur, operation proceeds to step S406. And, in step S406, error data is transmitted to the camera control CPU 31, Herein, camera control CPU 31 which receives the error data retracts, as described above, the main mirror 21 from the image taking light path, and displays that an image taking operation is prohibited in the display section 49 so as to give a warning to the user.

On the other hand, in step S405, when the size of the image pickup element 41 in the camera body on which a lens apparatus (image circle 100 2) is attached is a size corresponding to an image circle 100 2, since no image deterioration is produced, operation proceeds to step S401.

When the transmitted camera ID code data is unknown data in step S404, operation proceeds to step S401. In this case, since the size of the image pickup element 41 cannot be judged from the camera ID code data, the camera control CPU 31 judges an image circle of the lens apparatus based on the information concerning an image circle transmitted in step S205.

And, when the recording image data region in the camera body is a size corresponding to an image circle 100 1, as described above, the recording image data region is changed to a size corresponding to an image circle 100 2, and a warning is performed by prohibiting an image taking operation and displaying prohibition of the image taking operation.

In addition, when the recording image data region in the camera body is a size corresponding to an image circle 100 2, since an image deterioration is never produced, operations at the camera body side are continued without performing a warning.

According to the image taking apparatus of the present invention, since the recording pixel region (recording image region) in the image pickup element is changed in accordance with the image size of an attached lens apparatus, it can be prevented that recording image data is produced based on an output from pixel regions outside the image size within the recording pixel region and thereby image deterioration is occured In addition, by the image pickup element, an output from pixel regions outside the image size can be repressed, driving electric power of the image pickup element can be reduced (electric power saving). Furthermore, recording of unnecessary image data produced based on an output from pixel regions outside the image size is also eliminated.

Moreover, since the controller automatically changes the recording pixel region in accordance with an image size of the attached lens apparatus, usability of the image taking apparatus can be improved.

According to the image taking apparatus of the present invention, since a user can change the recording pixel region in Accordance with the image size of the lens apparatus by operating the operation section, as described above, an image deterioration can be prevented and electric power saving of the image taking apparatus can be realized.

By providing the electronic display unit for electronically displaying image data and displaying image data corresponding to the recording image data on the electronic display section, the region of image data to be recorded (image region) can be displayed for a user in an easy-to-understand manner.

In addition, by providing the optical display unit for displaying an object image formed by a light from an attached lens apparatus and for changing an optical display region corresponding to recording image data, in the optical display unit, the region of image data to be recorded can be displayed for a user in an easy-to-understand manner.

In the second aspect of the invention, it is judged whether or not the recording pixel region selected by the selecting section corresponds to the image size of an attached lens apparatus and, if not, image taking operation is restricted. Therefore, for example, the image taking operation in a case where the size of the recording pixel region is greater than the image size can be restricted. Thus an image deterioration in regions outside the image size caused by this image taking operation can be repressed and unnecessary electric power consumption (output of pixel regions outside the image size) can be reduced.

To the image taking apparatus of the invention by transmitting information concerning an image size from the lens apparatus, an image size can be easily judged in the image taking apparatus.

According to the lens apparatus of the present invention, a signal to limit image taking operation is transmitted, when the size of the image pickup element does not correspond to the image size or when the size of the image pickup element cannot be judged. Therefore, for example, in a case where the size of the image pickup element is greater than the image size, it can be repressed that image data is produced from regions outside the image size within image pickup element and an image deterioration is occurred. In addition, by repressing an output from regions outside the image size within the image pickup element, electric power savings can be realized.

While preferred embodiments have been described, it is to be understood that modification and variation of the present invention may be made without departing from the scope of the following claims.

"This application claims priority from Japanese Patent Application No. 2003-415793 filed on Dec. 12, 2003, which is hereby incorporated by reference herein."

What is claimed is:

1. An image taking apparatus to which a first lens apparatus having a first image size or second lens apparatus having a second image size smaller than the first image size are selectively attached, the image taking apparatus comprising:
   an image pickup element which photoelectrically converts an object image formed thereon into a signal;
   an image processing section which converts an output signal of the image pickup element into image data;
   a switching unit which switches the size of an image data region corresponding to the first image size within a light receiving region of the image pickup element or the size of an image data region corresponding to the second image size within a light receiving region of the image pickup element;
   an electronic display unit which electronically displays the image data; and
   a controller configured to receive information on the image size from one of the attached lens apparatuses and to receive information on the image size to which the size of the image data region corresponds from the switching unit, and configured to control the electronic display unit so that the electronic display unit displays the image data without changing the size of the image data if the both of the image size received from the attached lens apparatus and the image size received from the switching unit are the first image size, and displays enlarged image data which can be displayed in the electronic display unit if the image size received from the switching unit is the second image size.

2. The image taking apparatus according to claim 1,
   wherein the controller is configured to control the electronic display unit so that the electronic display unit displays an instruction indicating that image taking is prohibited and the size of the image data region is incorrect instead of displaying the image data if the image size received from the attached lens apparatus is the first image size and the image size received from the switching unit is the second image size.

3. The image taking apparatus according to claim 2, further comprising;

an optical display unit which optically displays the object image, wherein the controller is configured to control the optical display unit so that the optical display unit displays the object image without changing the size of the object image if the both of the image size received from the attached lens apparatus and the image size received from the switching unit are the first image size, and displays a magnified object image if the image size received from the switching unit is the second image size.

4. The image taking apparatus according to claim 3, wherein the optical display unit includes a visual field changing member which changes the visual field of the optical display unit, and wherein the controller is configured to control the visual field changing member so that the visual field changing member blocks nearly all of the object light passing through the light path of the optical display unit if the image size received from the attached lens apparatus is the second image size and the image size received from the selecting unit is the first image size.

* * * * *